(12) United States Patent
Rosenfeld et al.

(10) Patent No.: US 10,664,801 B1
(45) Date of Patent: May 26, 2020

(54) INVENTORY MANAGEMENT AND DISTRIBUTION OF PHYSICAL PRODUCTS

(71) Applicant: Jane Technologies, Inc., Santa Cruz, CA (US)

(72) Inventors: Socrates Munaf Rosenfeld, Santa Cruz, CA (US); Abraham Munaf Rosenfeld, Capitola, CA (US); Benjamin Aaron Green, Newton, MA (US); Scott Robert Tracy-Inglis, Denver, CO (US); Howard Hong, San Francisco, CA (US); Simon James Roddy, Marina Del Rey, CA (US)

(73) Assignee: Jane Technologies, Inc., Santa Cruz, CA (US)

( * ) Notice: Subject to any disclaimer, the term of this patent is extended or adjusted under 35 U.S.C. 154(b) by 0 days.

(21) Appl. No.: 16/212,538

(22) Filed: Dec. 6, 2018

(51) Int. Cl.
*G06Q 10/08* (2012.01)
*G06Q 30/02* (2012.01)

(52) U.S. Cl.
CPC ..... *G06Q 10/0875* (2013.01); *G06Q 10/0838* (2013.01); *G06Q 30/0202* (2013.01)

(58) Field of Classification Search
CPC ........... G06Q 10/0875; G06Q 10/0838; G06Q 30/0202
See application file for complete search history.

(56) References Cited

U.S. PATENT DOCUMENTS

| 5,220,501 | A | 6/1993 | Lawlor |
| 6,202,054 | B1 | 3/2001 | Lawlor |
| 6,519,571 | B1 | 2/2003 | Guheen |
| 9,836,772 | B1 | 12/2017 | Rosenfeld et al. |
| 1,018,114 | A1 | 1/2019 | Rosenfeld et al. |
| 2001/0051905 | A1 | 12/2001 | Lucas |
| 2002/0069093 | A1 | 6/2002 | Stanfield |
| 2002/0138358 | A1 | 9/2002 | Scheer |
| 2002/0147767 | A1 | 10/2002 | Brice et al. |
| 2003/0061125 | A1* | 3/2003 | Hoffman ................. G06Q 10/06 705/28 |
| 2007/0124216 | A1* | 5/2007 | Lucas .................. G06Q 10/087 705/26.1 |

(Continued)

OTHER PUBLICATIONS

Eadicicco, How Amazon Delivers Packages in Less Than an Hour, Dec. 22, 2015, Time, 1-4 (Year: 2015).*

(Continued)

*Primary Examiner* — Florian M Zeender
*Assistant Examiner* — Joseph M Mutschler
(74) *Attorney, Agent, or Firm* — Fish & Richardson P.C.

(57) ABSTRACT

Among other things, product data is repeatedly communicated from an application on a device associated with a retail location to a server of a platform controlled independently of the application on the device. The product data identifies (a) current numbers of units of products available for retail customers at the retail location and (b) purchasing behavior of retail customers of the retail location with respect to combinations of the products. The retail location is repeatedly restocked with additional units of products to maintain the products in an in-stock state, the additional units have been received in deliveries made from one or more upstream product distribution entities based on predictions facilitated by the server of future demand for the products by retail customers of the retail location.

27 Claims, 7 Drawing Sheets

(56) References Cited

U.S. PATENT DOCUMENTS

Figure 1:
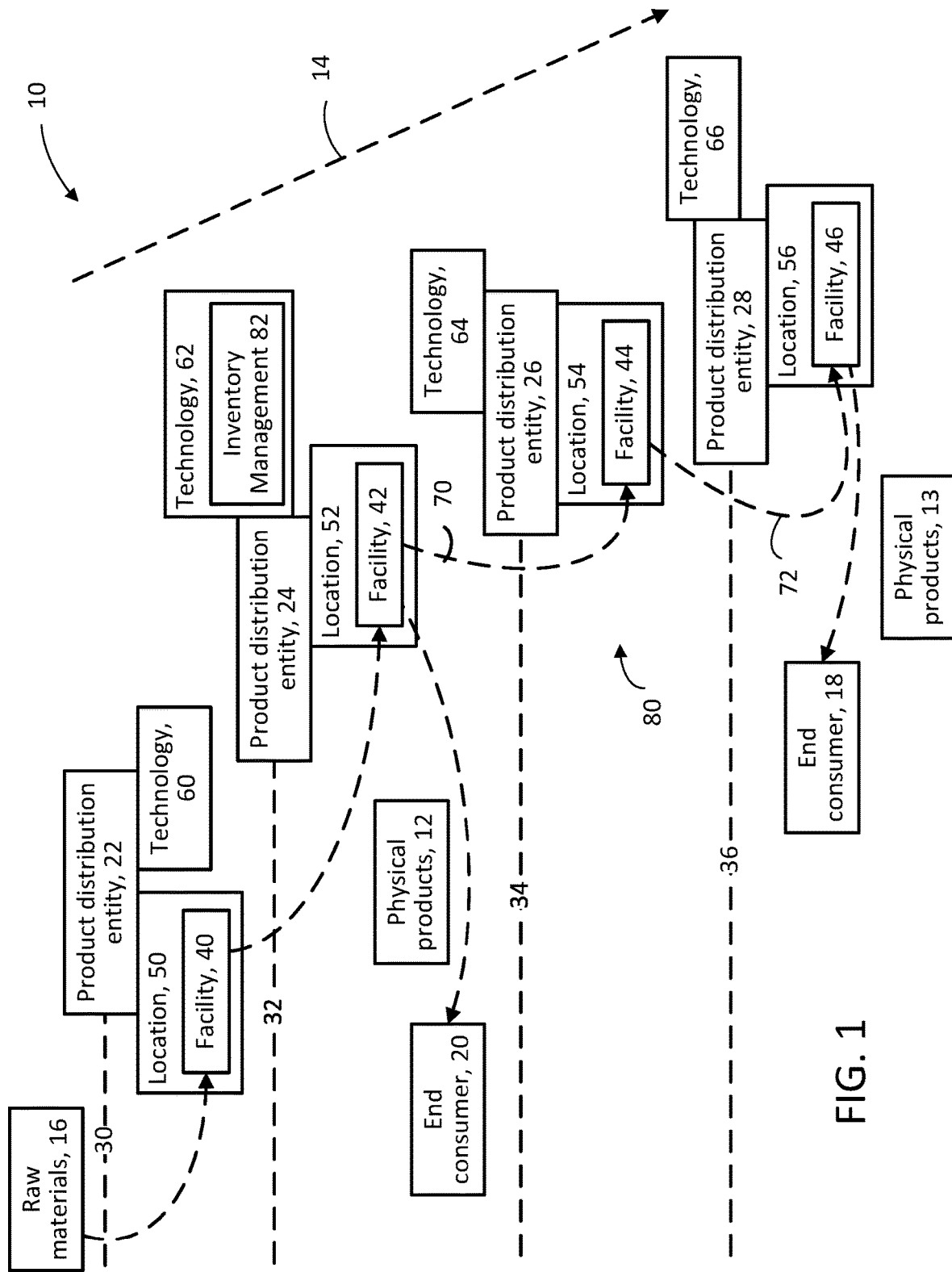

| | | | |
|---|---|---|---|
| 2009/0076896 | A1 | 3/2009 | DeWitt et al. |
| 2010/0070376 | A1 | 3/2010 | Proud |
| 2010/0286993 | A1 | 11/2010 | Lovelace |
| 2011/0208852 | A1 | 8/2011 | Looney |
| 2013/0290041 | A1 | 10/2013 | Harley |
| 2016/0232515 | A1 | 8/2016 | Jhas |
| 2016/0343057 | A1 | 11/2016 | Andon |
| 2017/0018013 | A1 | 1/2017 | Faust et al. |
| 2017/0352078 | A1 | 12/2017 | Rosenfeld et al. |
| 2018/0005171 | A1* | 1/2018 | Harsha ............... G06Q 10/087 |
| 2018/0047078 | A1 | 2/2018 | Rosenfeld et al. |
| 2019/0114686 | A1 | 4/2019 | Rosenfeld et al. |

OTHER PUBLICATIONS https://www.groovypost.com/howto/google-shopping-search-nearby-23092/ , Aug. 20, 2011 (Year: 2011).*

Apple: http://www.apple.com/, 17 pages, downloaded Nov. 3, 2016.

Baker: http://info.trybaker.com/baker-greenbits-integrat, Baker Greenbits Integration, 3 pages, downloaded Jan. 18, 2018.

Baker: https://help.greenbits.com/hc/en-us/articles/115001272351-Menu-Feed-Setup-for-Baker, Menu Feed Setup for Baker—Help Center, 6 pages, downloaded Jan. 18, 2018.

BestBuy: http://www.bestbuy.com/, 3 pages, downloaded Nov. 3, 2016.

GrubHub: http://www.grubhub.com/, 4 pages, downloaded Nov. 3, 2016.

IKEA: http://www.ikea.com/us/en/, 4 pages, downloaded Nov. 3, 2016.

KGS Buildings: http://www.kgsbuildings.com, 5 pages, downloaded Nov. 3, 2016.

Shopify: http://www.skuiq.com/shopify-retail-operations-software/, Shopify Integration—Lightspeed, Clover, Vend, Erply, Square, 3 pages, downloaded Jan. 18, 2018.

Shopify: https://hikeup.com/us/shopify/, Hike + Shopify | Connecting POS & eCommerce Platforms Seamlessly, 4 pages, downloaded Jan. 18, 2018.

USPTO Transaction history, application as filed for U.S. Appl. No. 15/342,557.

USPTO Transaction history, application as filed for U.S. Appl. No. 15/790,865.

USPTO Transaction history, application as filed for U.S. Appl. No. 16/218,303.

Pending U.S. Appl. No. 16/212,538, filed Dec. 6, 2018, Joseph M. Mutscher, No—submitted on May 16, 2018

Pending U.S. Appl. No. 16/722,181, filed Dec. 20, 2019—Pending, No Submitted on Dec. 20, 2019.

Apprise, "ERP & Distribution Software for Wine & Spirits", https://www.apprise.com/industries/wine-spirits.aspx, retrieved from the Internet on Dec. 6, 2018 (3 pages).

Sapphire, "Wholesale & Distribution Software Solutions", https://www.sapphiresystems.com/en-us, retrieved from the internet on Dec. 6, 2018 (9 pages).

Stitchlabs, "Multichannel inventory management Ecommerce Software", https://www.stitchlabs.com/multichannel-inventory-management, retrieved from the Internet on Dec. 6, 2018 (7 pages).

Oracle, "Oracle NetSuite", Cloud Inventroy Software, retrieved from the Internet on Dec. 6, 2018 (3 pages).

BrightPearl, "Advanced inventory management solution for retailers and wholesalers", retrieved from the Internet on Dec. 6, 2018 (8 pages).

Acumatica, "Distribution Management Software", Acumatica cloud ERP, retrieved from the Internet on Dec. 6, 2018 (7 pages).

Accolent ERP, "End to End Business Software for Distribution & Light Manufacturing", retrieved from the Internet on Dec. 6, 2018 (7 pages).

Unbouncepages, "eTurns Remote Stockroom Inventory Management", retrieved from the Internet on Dec. 6, 2018 (5 pages).

Repsly, "Field Sales with Repsly—The Powerful, Data-Driven Approach to Field Sales", retrieved from the Internet on Dec. 6, 2018 (7 pages).

SevenFifity, "Powering a Connected Three-Tier System—Beverage Alcohol Platform", retrieved from the Internet on Dec. 6, 2018 (6 pages).

Cin7, "Inventory management system, inventory system, inventory control Cin7", retrieved from the Internet on Dec. 6, 2018 (10 pages).

GoFrugal, "Download Retail Billing Software, GST Retail ERP POS System" retrieved from the Internet on Dec. 6, 2018 (11 pages).

Ecomdash, "Amazon Inventory Management Software Solution", retrieved from the Internet on Dec. 6, 2018 (10 pages).

Omni Channel Solution, "Retail Software with POS on cloud for retail chains with Ecommerce", retrieved from the Internet on Dec. 6, 2018 (4 pages).

* cited by examiner

INVENTORY MANAGEMENT AND DISTRIBUTION OF PHYSICAL PRODUCTS

BACKGROUND

This description relates to inventory management and distribution of physical products.

Distribution of physical products 12, 13 in a typical product market 10 proceeds in stages through a distribution chain 14 from raw materials 16 used in the manufacture of the products through delivery of the products to end consumers 18, 20. The end consumers can be individuals 18 in the case of retail products 13 or enterprises 20 in the case of commercial products 12.

The activities involved in product distribution can be performed, controlled, or managed by one or more product distribution entities 22, 24, 26, 28 associated with the stages 30, 32, 34, 36 of the distribution chain. Examples of product distribution entities include: manufacturers 22, distributors 24, wholesalers 26, and retailers 28, among others. In the case of retail products, the product distribution entity at the final stage of the distribution chain can be a retailer delivering (or managing, arranging, or facilitating the delivery of) the physical products to individual end consumers.

SUMMARY

In general, in an aspect, product data is repeatedly communicated from an application on a device associated with a retail location to a server of a platform controlled independently of the application on the device. The product data identifies (a) current numbers of units of products available for retail customers at the retail location and (b) purchasing behavior of retail customers of the retail location with respect to combinations of the products. The retail location is repeatedly restocked with additional units of products to maintain the products in an in-stock state, the additional units have been received in deliveries made from one or more upstream product distribution entities based on predictions facilitated by the server of future demand for the products by retail customers of the retail location.

Implementations may include one or a combination of two or more of the following features. The product data is communicated in response to polling. The application running on the device includes a POS system. The predictions have been based on the product data communicated to the server. The predictions have been based on product data communicated to the central server from applications on devices associated with other retail locations. The deliveries have been made without any action have been required by the retail location. The units of the products are transferred to retail customers without delay after purchase by the retail customers. The units of products are delivered within eight hours after they are ordered or purchased.

In general, in an aspect, an application on a device associated with a wholesaler or distributor of retail products to retail locations repeatedly receives product data from a server of a platform controlled independently of the application on the device. The product data identifies predictions of units of products to be delivered and timing of deliveries of the units of products to retail locations to maintain the products in an in-stock state. The identified units are caused to be delivered to the retail locations at times consistent with the identified timing of deliveries.

Implementations may include one or a combination of two or more of the following features. The application on the device includes a component of an inventory management system. The predictions having been based on product data received by the server from the retail locations. The received product data has identified (a) current numbers of units of products available for retail customers at the retail locations and (b) purchasing behavior of retail customers of the retail locations with respect to combinations of the products. In some implementations, the delivery is caused without requiring prompting by the retail locations.

In general, in an aspect, product data is repeatedly received at a server of a platform from devices associated with physical retail locations. The product data identifies numbers of units of products currently available for retail customers at the physical retail locations, the platform being controlled independently of the physical retail locations. Product data stored at the server is repeatedly updated to reflect the repeatedly received product data. Pages are served from the server through a communication network to web browsers of computing devices or apps of mobile devices. The pages identify units of products currently available at the physical retail locations. The pages being are based on the updated product data stored at the server.

Implementations may include one or a combination of two or more of the following features. The devices associated with the physical retail locations include components of POS systems. The product data is received at the server without requiring action by the physical retail locations.

In general, in an aspect, product data is repeatedly received, at a server of a platform, from devices associated with product distribution entities. The product data has aspects confidential to the product distribution entities. The platform is controlled independently of the product distribution entities. The product data, including the confidential aspects, is stored at the server. Access is controlled to protect the confidential aspects of the product data. The product data is processed to produce derived information about a product distribution chain for the products. The derived information does not reveal the confidential aspects. The derived information is communicated to participants of the platform.

Implementations may include one or a combination of two or more of the following features. The processing of the product data includes predicting demand for the products. The processing of the product data includes aggregating the data to produce aggregated data free of the confidential aspects. The processing of the product data includes analyzing consumer demand behavior. The processing of the product data includes analyzing supply. The storing of the product data includes translating the product data to a canonical form and storing the canonical form. The communicating of the derived information includes translating the product data from the canonical form to proprietary forms used by the participants of the platform. The receiving of product data from devices associated with product distribution entities includes receiving product data from product distribution entities at two or more stages of a product distribution chain. The receiving of product data from devices associated with product distribution entities includes receiving product data from product distribution entities that are competitors at a given stage of a product distribution chain. The product data includes transactions in which products are sold by product distribution entities to end consumers.

These and other aspects, features, implementations, and advantages (1) can be expressed as methods, apparatus, systems, components, program products, business methods, means or steps for performing functions, and in other ways, and (b) will become apparent from the following description and from the claims.

DESCRIPTION

FIGS. 1 through 7 are block diagrams.

HOW PRODUCT DISTRIBUTION WORKS

Stages of the Distribution Chain

Each of the stages in the distribution chain for a product market is characterized by its association not only with one or more product distribution entities, but also with product storage facilities 40, 42, 44, 46 (for example, a warehouse), a geographic distribution location 50, 52, 54, 56 of each product storage facility, and a distribution management technology 60, 62, 64, 66, among other things.

Distribution management technology can include computer-based systems to facilitate a variety of activities including the ordering of products from product distribution entities at upstream stages, the receipt and placing of received physical products into inventory at the product storage facility, the tracking and maintenance of the inventory in the product storage facility, the receipt and fulfillment of orders for physical products from product distribution entities at downstream stages, the analysis and prediction of demand by downstream product distribution entities or end consumers, and the analysis and prediction of availability of products from upstream product distribution entities (e.g., vendors or suppliers). Each product storage facility can include or be associated with capabilities for receiving, handling, storing, counting, safeguarding, and shipping physical products, among other activities.

Delivery

The complete distribution chain for a particular product or product market includes not only the product distribution entities at successive stages, but also product delivery entities delivering 70, 72 the physical products from each upstream product distribution entity to a downstream product distribution entity. The delivery can be performed by product distribution entities themselves or by third-party contractors, for example.

In some product markets, each stage of the distribution chain can include many competitor product distribution entities (not shown). Physical products can follow different paths (not shown) through different product distribution entities of the distribution chain on their way to the end consumers.

Taxonomy

In some instances, physical products distributed through the distribution chain can be identified using a hierarchy (or taxonomy) of descriptive identifiers. For example, within a particular distribution chain or product market, physical products can be identified by product category, such as film cameras, digital single-lens-reflex cameras, and digital point-and-shoot cameras. Within each product category, products can be identified by product manufacturer, such as Canon, Nikon, and Leica. For each product manufacturer, products can be identified by product model number, such as Nikon D850 or Nikon D7500. Within each model number, individual units of a product can be identified by, say, a product serial number. Other taxonomies, ontologies, and hierarchies may apply in other product markets. Distribution of physical products through the distribution chain of a product market is often tracked and managed in terms of a number of product units of a given product, manufacturer, and model number for purposes of shipping, ordering, order fulfillment, and inventorying. For example, a camera distributor may receive an order for 50 units of Nikon D850 digital single lens reflex cameras. We sometimes use the term "product" to refer to any of the groupings of products within a level or combinations of levels of the hierarchy. We sometimes use the term "units" to refer to individual product units.

Such hierarchies of descriptive identifiers can be useful in acquiring, maintaining, organizing, processing, analyzing, and communicating data about product distribution activities and in presenting information about products to customers.

Inventorying

Typical product markets and distribution chains are characterized by inefficiencies in the flow and inventorying of products. Because it takes time for delivery of products from stage to stage in a distribution chain and because larger than ideal levels of inventory may need to be maintained at one or more stages, moving products through the distribution chain can add to the cost and reduce the profits of product distribution entities along the distribution chain.

Among other expenses, each product distribution entity must devote capital to the inventorying of products in its product storage facilities. The capital required for inventory depends not only on the number of products and the number of units of each product stored, but also on the amount of time that each of the units of each product remains in a product storage facility.

Because the cost of capital impacts profitability, each of the product distribution entities aims to minimize the number of units of each product held in product storage facilities and the length of time each of the units is held. A key step for a product distribution entity to minimize inventory costs is to match supply from upstream stages to demand from downstream stages of the distribution chain. Demand can include the current demand and expected demand for products from downstream product distribution entities or end consumers. Supply can include the current supply and expected supply of products or raw materials from upstream stages of the distribution chain.

If the product distribution entity can accurately predict supply and demand, it can take steps to match them. Yet supply and demand are hard to predict and subject to variations over time (e.g., unexpected orders or large orders). As a result, a product distribution entity may need to inventory more products and more units of products (safety stocks) than would otherwise be needed as a buffer against unexpected higher demand or unexpected lower supply. Failing to meet demand can impact an entity's reputation, create a negative customer service experience, and result in lost future business. The capital cost of safety stocks can extend to rental costs for additional warehouse space to accommodate the safety stock. In addition, if products in the safety stock have limited shelf lives, units of product in the safety stock could reach an expiry date or be superseded by new models or versions of the product or new products, forcing the product distribution entity to discard or destroy them.

To predict and match supply and demand accurately, product distribution entities need accurate, complete, and current product data.

Distribution Management Technology

The distribution management technology owned, controlled, or managed by each product distribution entity can, among other things, receive, store, maintain, analyze, and provide product data (sometimes simply "data") associated with products received, inventoried, and sold by the product distribution entity and with the entity's role in distribution of the products. For example, the product data can include products ordered, products in inventory, products shipped, predicted product demand, predicted product supply, and historical product data, among a wide variety of other data items.

Product data can have great value to a product distribution entity and provide a competitive advantage in the product market, for example. Therefore, depending on the product market and the product distribution entity, a product distribution entity may keep its product data secret from its competitors and other parties. In some cases, however, limited product data may be shared between two product distribution entities doing business with one another at successive stages of the distribution chain. For example, a retailer may share with a wholesaler product data indicative of the retailer's predictions about future end consumer demand for particular products so that the wholesaler can serve the retailer more effectively.

Inventory Management Systems

As part of their distribution management technology, manufacturers, wholesalers, distributors, retailers, and other product distribution entities use a variety of inventory management systems and components of them including: Material Requirements Planning (MRP) systems, Enterprise Resource Planning (ERP) systems, Warehouse Management System (WMS) systems, and Point of Sale (POS) systems, for example. The inventory management systems, components of them, and combinations of the systems and components differ with respect to different stages of the distribution chain.

MRP systems help manufacturers calculate what raw materials they need, when, and in what quantities. MRP II systems are a more recent version of MRP and include detailed capacity planning, scheduling, shop floor control, and other calculations. MRP II enables manufacturers to compare forecast product data with actual product data and analyze performance and improve processes.

ERP systems are typically suites of integrated applications that an entity can use to collect, store, manage, and interpret product data from departments of the organization, such as purchasing, sales, manufacturing, human resources, services, and inventory.

WMS systems help manage day-to-day operations in a warehouse. WMS software guides inventory receiving and put-away, optimizes picking and shipping of orders, and advises on inventory replenishment. A warehouse management system can be a standalone application or part of an ERP system, among other implementations.

POS Systems

POS systems, which are typically used by product distribution entities that are retailers, are combinations of hardware and software built to centralize business operations. POS systems can manage the transactions of a business (including credit card processing and the post-transaction operations that lead to fulfillment of the transactions), store, maintain, and update product data as transactions are processed, track inventory and sales (and other product) data at individual retail locations, and aggregate inventory and sales data for multiple retail locations owned or controlled by a particular retailer, for example.

POS systems are usually proprietary; the product data that they generate and maintain is not shared between separate retail locations or retailers. Typical proprietary POS systems are not built to cooperate with other POS systems. Competing developers of POS systems are reluctant to provide integration features or to enable them to share product data. Many POS systems use proprietary data formats, database schemas, and communication protocols making it challenging for different POS systems to share product data and communicate with one other.

In addition to being incompatible with product data of other POS systems, the product data generated by a proprietary POS system may not be complete, accurate, or current. And product data often is stored securely with limited access only to a single retail location or a single retailer who owns or controls the POS system.

At other stages of a distribution chain, the product distribution entities also use systems that has similarities to POS systems to track products and generate product data. Such systems often have features and shortcomings similar to those of POS systems at the retail level.

Product data is typically stored in databases controlled by product distribution entities for their own benefit. The databases are maintained and used by components of the distribution management technology. Each of the databases is typically segregated for each component and access is limited to authorized representatives of the product distribution entity using unique usernames and passwords valid only for that database and for a single component. Different product distribution entities that make use of product data applications and databases often are assigned separate databases and accounts per application to mitigate the risk of unauthorized access across the instances of the applications (and therefore between unrelated product distribution entities).

Flow of Products and Collection of Product Data Through the Distribution Chain

As products move from stage to stage through a distribution chain, the product distribution entities use their inventory management systems to track the products and the activities associated with their distribution and generate and store corresponding product data.

For example, an inventory management system can track the movement of raw materials to the production line at a manufacturing facility. Product data then is updated to show that the raw materials stock in the warehouse has been reduced and the raw materials available to support production have increased. When the products are moved from the production line to the warehouse, the inventory management system is updated to show how many units of product were produced, when they were manufactured, and where they have been stored awaiting distribution.

Once the manufacturer receives a purchase order from a wholesaler or distributor, the manufacturer will remove the ordered products from the local warehouse, package them, and prepare them to be transported to the purchaser. Then the manufacturer will update its inventory management system to reflect the reduction in inventory and the fact that the products are being delivered to the customer's distribution location.

When received, the wholesaler will inspect the products for quality control, ensure they match what was ordered, enter them into its inventory management system, and move them to a defined storage location in its warehouse. The wholesaler will hold the products in its warehouse until it receives an order from one of its downstream retailers or other downstream product distribution entities. This order will typically arrive as a purchase order detailing products the retailer wants to buy, the number of units of each product, and when and where the ordered products should be delivered. These activities by the wholesaler can be entered as product data into its inventory management system.

A purchase order may cover products that originate from several different manufacturers or may be for products that come from a single manufacturer. In the first scenario, the wholesaler or distributor will withdraw the products requested from its inventory, combine them into a single shipping unit and prepare it for delivery. As the products are removed from inventory the inventory management system will be updated to show a reduction in inventory and a corresponding increase in the inventory that has been assigned to that purchase order. When the order is ready, the wholesaler or distributor will arrange for delivery to the retail location. When the products leave the warehouse for delivery, the inventory management system is again updated.

At the final stage of the distribution chain in the context of retail products, retailers place orders with wholesalers and distributors for products and numbers of units of each product for stocking in their retail locations to serve expected demand of end consumers. When the retailer receives ordered products at its warehouses or its retail locations, the retailer inspects them to ensure that they match the purchase order and the level of quality meets expectations, then updates its inventory management system to show the increase in stock (inventory).

In some cases, rather than initiating purchase orders, the retailer waits for the wholesaler's or distributor's representative to visit the retail location in a sales call. The visit may include an introduction of new products to the retailer. And the wholesaler's, distributor's, or manufacturer's representative may take stock of the retailer's inventory to determine what products and how many units of each need to be re-ordered. Employing such representatives can be a significant expense of the wholesaler, distributor, or manufacturer.

The product distribution entities in the distribution chain therefore are continually generating a large volume of detailed product data, although much of it is never shared with other parties. At the same time, there can be significant gaps in the product data generated in the first place, for various reasons. Different product distribution entities will vary widely in the sophistication of their inventory management systems. The inventory management systems will also vary in their capabilities for collecting product data from rudimentary to highly sophisticated. In some cases, the collected product data will be incorrect or incomplete or lost.

Optimizing Inventory

The Theory

As explained above, to minimize their costs and maximize their profits, retailers, manufacturers, wholesalers, distributors, and other product distribution entities aim to maintain optimal inventory levels at their retail locations.

In theory, each product distribution entity could minimize (reduce essentially to zero) the number of products, the number of units of each product, and the period during which each unit is stored, if the entity always possessed or could access complete, accurate, and current product data of other product distribution entities at the same stage or different stages of the distribution chain. Such exhaustive product data would enable the entity to determine or predict the current and anticipated demand for every product and for units of each product from downstream stages. The product data would also enable the entity to determine or predict the current and future availability of products or raw materials from upstream stages including amounts of delay to be expected currently and in the future in the receipt of products or raw materials. In such an ideal scenario, essentially no unit of product would need to be stored in inventory, because each unit of each product would arrive at each product storage facility at the exact time needed for shipping to the downstream customer.

The Reality

In reality, the optimal inventory situation is unreachable. One significant reason is that exhaustive product data is not available to the product distribution entities in the distribution chain. Accordingly, it becomes impossible or difficult for inventory management systems to generate useful analyses and predictions of demand and supply and a variety of other features of the product distribution process. The result is significant inefficiencies in product distribution, higher costs, and lost profits, among other disadvantages.

Techniques to Reduce Inventory

Nevertheless, useful techniques are available for inventory management, notably techniques based on predicting product demand and product supply. For the purpose of making such predictions, product distribution entities often use simple or sophisticated mathematical predictive models of portions of the distribution chain that are most relevant to them. A wide variety of modeling techniques are used in the resulting predictions may vary widely in their reliability and accuracy. Predictive models of aspects of the distribution chain tend to be more accurate and more useful when the quantity of product data (current and historical) is large, complete, and accurate. To the extent that in a given distribution chain, the product data is sparse, incomplete, outdated, or inaccurate, the predictive models suffer in their ability to provide useful predictions.

Other inventory reduction techniques are possible.

In some cases, an upstream product distribution entity (for example, a manufacturer) can work with a product distribution entity at the downstream stage (for example, a wholesaler or distributor) to understand its expected demand for an upcoming period (which could be a year or more depending on the product). Then the product distribution entity can determine what to manufacture, how much of each product to produce or stock, when to produce it or stock it, and how much to hold in its inventory.

Once a product distribution entity understands the likely future demand for its products and the ability of the manufacturer or other upstream product distribution entity to supply products to meet that demand, the product distribution entity and the downstream product distribution can enter into a purchase order or contract that defines what is going to be ordered and when. With this in hand, the upstream product distribution entity can plan its operation efficiently. For example, a manufacturer can buy the right amount of raw material when needed to manufacture the selection of products and the number of product units of each product expected to be in demand.

In some cases, the efficiency of the flow of raw materials and products through a distribution chain depends on the degree of vertical integration in the product market, the degree of fragmentation of the entities in the product market, the nature of the products being sold, and end consumers' purchasing behaviors and expectations.

If a supplier and a downstream customer (e.g., wholesaler and retailer) have worked together for many years they are more likely to share sales and inventory product data. However, if the industry is fragmented and the downstream customer changes suppliers frequently, sharing of product data is less likely. This reluctance to share product data hinders the supplier's effort to develop accurate demand forecasts and makes it more likely that the supplier will be unable to meet its customer's demands.

As an example of vertical integration, product distribution entities in the automobile industry have worked to integrate their operations and share data to improve their efficiency and profitability. The shared data allows relatively accurate predictions of supply and demand at each stage enabling a product distribution entity to plan what it is going to produce or order and what it is going to supply and sell.

Conversely, the clothing industry is fragmented among many manufacturers, distributors, wholesalers, and retailers often operating in isolation and competing against each other. Clothing distribution entities are reluctant to share product data for reasons including high rates at which manufacturers and retailers are formed or go out of business, and the low margins characteristic of clothing distribution entities. Therefore, flow of raw materials and products through the distribution chain is not efficient.

In addition to predicting demand, other inventory management processes can be applied to manage inventories including production planning, fine-grained tracking of the location and status of raw materials and products, and just-in-time receipt of raw materials or products from upstream suppliers, to name a few.

The value of a supplier's customer demand model depends on the completeness, accuracy, and timeliness of product data from customers. Having such product data turns on the customers' willingness to share their proprietary product data and the supplier's ability to collect it and interpret it. This is a challenging endeavor if the lead time for the products that it manufactures or supplies is long. The product data may have to be collected months or years before the customer will need the product, yet product data collected early is more likely to be incorrect or outdated.

A product distribution entity may not be able to accurately forecast its customer's demand due to: lack of information, poor planning, seasonal variations, industry fragmentation, inexperience, lack of an adequate inventory management system, lead time, delivery variability, supplier performance or reliability, and other factors, and combinations of them.

Universal Inventory Management and Product Distribution Platform

Figure 2:
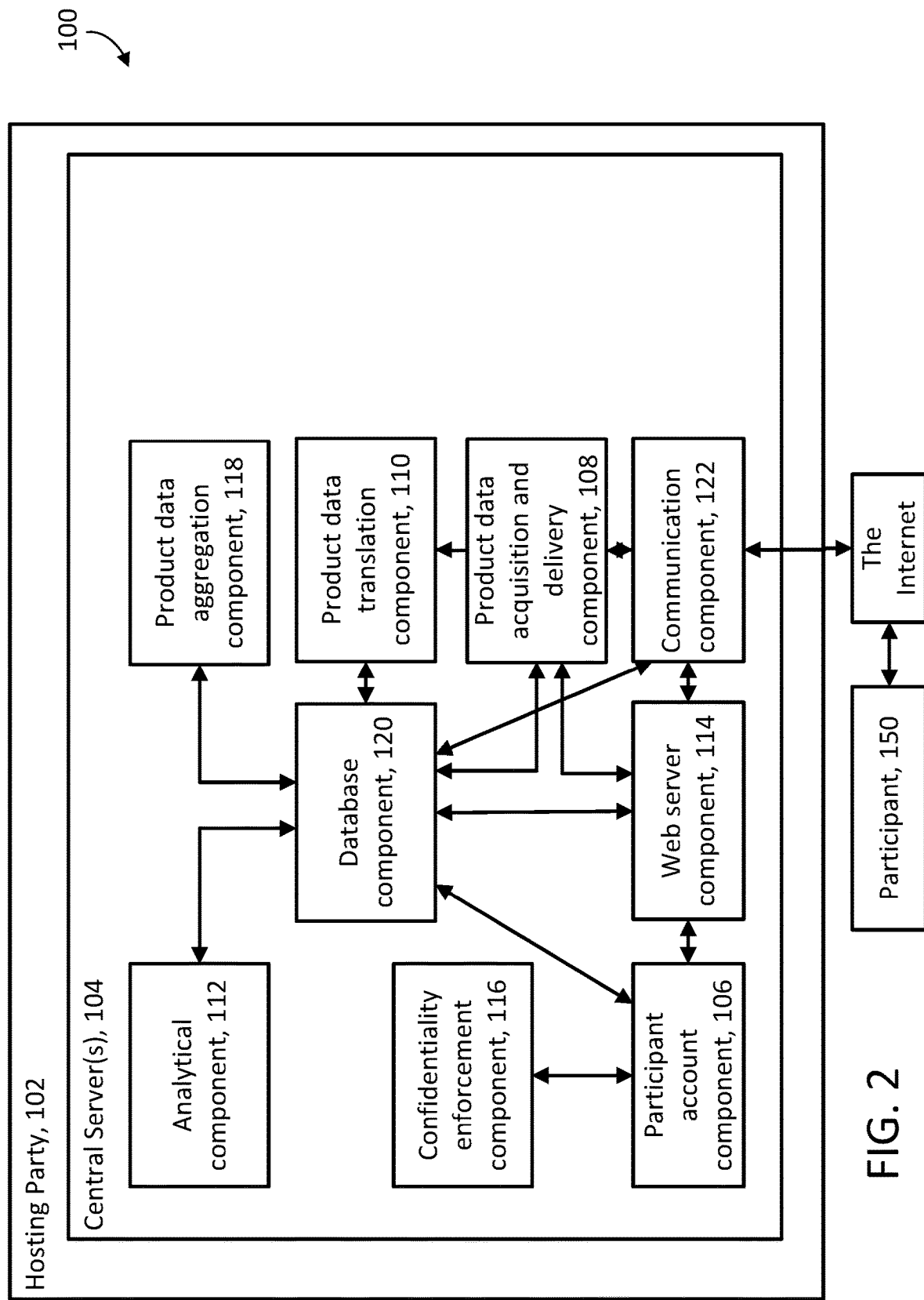

As shown in FIG. 2, here we describe a technology that we sometimes refer to as a "universal inventory and product distribution platform" 100 or a "universal platform" or simply a "platform." The universal platform 100 can significantly improve the efficiency, profitability, speed, and effectiveness of each product distribution entity (and the aggregation of product distribution entities) at each stage of the distribution of physical products through a distribution chain from raw materials used in the manufacture of the products through delivery of the products to end consumers. These improvements can be achieved as a result, for example, of more accurate, timely, and complete product data being accumulated, stored, analyzed, and made available to and among product distribution entities and other participants by the universal distribution platform. The improvements can benefit individual product distribution entities, pairs and groups of such entities, and in some cases an entire product market or distribution chain. The improvements can be used to provide new and beneficial applications and capabilities for distribution chains, product markets, product distribution entities, delivery entities, and other participants in the platform.

The platform can enable every product distribution entity at every stage of the distribution chain to, among other things, minimize its inventory and optimize the ordering, inventorying, and shipping of products at all times. When the technology is applied by multiple product distribution entities in the distribution chain, the overall efficiency of the distribution chain will improve. The technology is applicable to the distribution chain for every kind of physical product and for every kind of vertical or general product market for physical products and for every geographic context.

Some implementations of the platform apply to the process of supplying products from manufacturers in a product market (and potentially across product markets) through distribution chains to retail locations and to retail end consumers using a network of product distribution nodes controlled by respective product distribution entities.

As illustrated in FIG. 1, typically each product distribution node 80 (or simply "node") has an inventory facility (e.g., a warehouse), one or more portals to receive products at the inventory facility from upstream product distribution entities (suppliers), one or more portals (which could be the same as portals) from which to deliver products from the inventory facility to downstream customers, product distribution management technology that includes inventory management systems (e.g., inventory management system 82) and other systems, to manage the flow of products into the portals and out of the portals and the maintenance of products in the inventory facility, among other things.

In effect, the products held at product distribution nodes and products being delivered between nodes of the distribution chains in a given product market represent the aggregate total current global inventories of products of that product market. From the perspective of the overall product market, the total inventories of products held in the global inventories should be as small as possible, ideally essentially zero and the time required to deliver the products from manufacturer to end consumer should be essentially zero. In such a scenario, at each moment when an end consumer seeks to buy a product, the manufacturer could produce it, and have it delivered to the end consumer instantaneously.

To the extent that, in real-world situations, delays occur in manufacturing, ordering, and delivery, inventories must be maintained to accommodate such delays and uncertainties in demand and supply. Corresponding costs are incurred that reduce the profitability of the product distribution entities and the product market as a whole. The profitability of the product distribution entities for a product market as a whole could be optimized by minimizing the number and length of delivery delays and minimizing the number of units of product inventoried by each product distribution entity individually and all of the product distribution entities taken as a whole.

In any product market, each product distribution entity strives independently to minimize the number of products held in its inventory facility and the delivery delays and to increase the demand for products by its customers by providing good service. The platform enables each product entity to achieve these goals by causing product data that otherwise would not be collected or would be kept secret by each of the entities to be collected and made available to other entities in the distribution chain. The platform can help to assure that current, complete, and accurate product data is readily available, accurate, timely, and complete.

The platform facilitates the collection of complete, accurate, timely product data from potentially all of the product distribution entities, delivery entities, and other parties associated with the distribution chain (that is, all of the participants in the platform).

Hosting Party, Servers

For this purpose, the platform is hosted by a hosting party 102 that, in some implementations, is not (and is known not to be) a product distribution entity, a delivery entity, or a participant in any other role in the platform. In a sense, the hosting party is understood to be an "honest broker" of product data and not a party that can itself benefit directly from the use of product data for purposes of product distribution. The hosting party, of course, can derive revenue from participants in exchange for services that it performs and information that it provides through the platform to participants.

The platform can be hosted on a central server or servers 104 that are located at the site of the hosting party or are hosted by a cloud service or a combination of those approaches. Software running on hardware (including processors) at the central server or servers can include at least the following components: a participant account component 106, a product data acquisition and delivery component 108, a product data translation component 110, an analytical component 112, a web server component 114, a confidentiality enforcement component 116, a product data aggregation component 118, a database component, a communication component 120, a communication component 122, and other components. Additional information about these components is provided later.

A wide variety of applications are possible for the platform across a range of product markets, distribution chains industries, stages of distribution chains, and product types. The applications can be in markets for commercial products and commercial consumers and in different stages (such as, manufacturers, distributors, or wholesalers) of the distribution chains for those markets.

Product Data

The hardware and software of the platform is structured and configured to enable any participant 150 to submit product data at any time, from time-to-time, regularly, or on demand to the platform for storage in the database component 120. We sometimes refer to such data as submitted product data. The platform also enables authorized participants to search for and access submitted product data (subject to security, anonymization, and aggregation techniques described below) at any time, from time-to-time, regularly, or on demand. We sometimes refer to such data as accessible product data. Therefore, the platform serves as a clearing house for product data.

Submitted product data and accessible product data can include information about products that have been ordered from upstream product distribution entities, are being delivered, have entered inventory, are in inventory, have left inventory, or have been ordered by downstream product distribution entities, among other things. Submitted product data and accessible product data can include product transaction data about orders, purchases, and sales of products. Submitted product data and accessible product data can be expressed at any level of the product hierarchy, for example, using descriptive identifiers associated with product categories, product manufacturers, product model numbers, product serial numbers, and with respect to individual product units.

Submitted product data and accessible product data can be expressed as product data records. Each of the product data records can include one or more of the following product data fields or other product data items: descriptive identifiers for a product expressed at any level of the hierarchy, number of units of a product, a date and time of the transaction or event related to the product, status of a product (e.g., in inventory, in delivery, ordered, in process, subject to pending order, subject to predicted order), location, price, discount, or commission, for example. A product data record could include any other data field or other product data item that is generated or owned, controlled, or managed by any participant in the platform or would be useful to any participant in the platform for purposes of ordering, delivering, or inventorying, managing any of those activities, modeling, or any other activity that improves the efficiency of any stage of the distribution chain, or combinations of those activities.

Product data and product data records generated, or owned, control, or managed by any participant were stored and used at the central server can be accumulated, total, or otherwise aggregated to form aggregated product data or aggregated product data records for any of the activities noted above. The aggregation can be across product distribution entities at any given stage of the distribution chain or across two or more stages or both. Although each product data record can be associated with a particular time or a particular geographic location or both, product data records and product data can be aggregated over a period of time or across two or more geographic locations or both.

In some cases, submitted product data records can be protected by a wide variety of encryption, secret sharing, or other security techniques and combinations of them.

The Virtuous Cycle of More Data and Better Insights

Participants in the platform often will be providing submitted product data considered secret and valuable by the participants, and versions of that submitted product data may be made available to other participants, for example, as aggregated product data or aggregated product data records. Aggregating of product data and product data records can have an advantage of hiding or masking specific product data records have a particular participant, just as aggregating data about high net worth individuals living in a particular city can be used to mask the identity of any particular high net worth individual. Nevertheless, even in aggregation, product data records may provide information useful to another participant. Furthermore, in some uses of the platform, submitted product data records are not aggregated and not hidden and yet may be provided to and useful to other participants in the platform. The disclosure of such submitted product data records carries risks.

In exchange for its risk of disclosure of its own product data records even in an un-aggregated form, a submitting participant receives the benefit of being able to access product data in product data records (including unmasked product data records and aggregations of product data records) generated or controlled and submitted to the platform by other participants including the first participant's competitors, suppliers, and customers. As additional value in exchange for disclosing its own product data, the participant can also receive valuable analysis and insights about supply, demand, prices, and other information associated with product data and with the product market in which it participates.

Notwithstanding these benefits of participation, participants need to be confident in the willingness, commitment, and ability of the platform (and the hosting party) to safeguard their product data, to use in distributed only as agreed, and to continually improve the analyses and insights provided back to the participants. Once the platform has demonstrated such willingness, commitment, and capability, its reputation for providing useful information within a product market while protecting participant's information will attract more participants and the submission of more complete, accurate, and timely product data from existing participants. The additional product data and additional participants in turn enable the platform to improve the comprehensiveness of product data that it has available, can aggregate, and report, and the quality of the product data, aggregations, analyses, and insights that it makes available.

The resulting cycle is virtuous. Among other things, the improved platform may be able to keep costs to participants low.

An important aspect of the building and maintaining of confidence of the participants in the platform may, in some cases, be its ability to protect the confidentiality of the product data of participants, anonymize fields of the product data, aggregate fields of the product data while excluding identifiable confidential information, and control the access of participants to product data maintained by the platform.

Participant Hardware and Software

Figure 3:
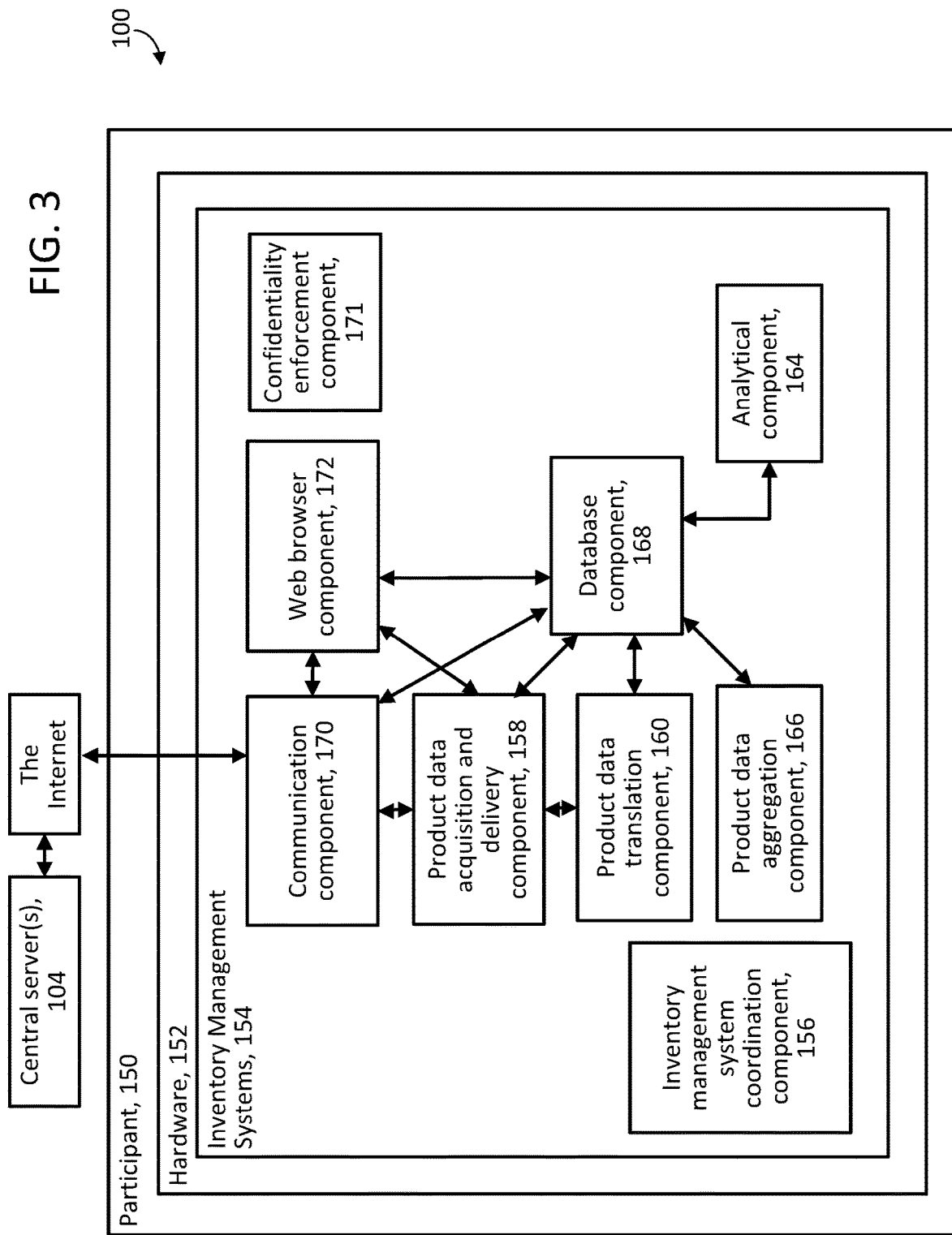

As shown in FIG. 3, in addition to the hardware and software hosted by the hosting party at the central server, the platform can include one or more of the following components running (for example, as part of a participant's inventory management system 154 in the case of a participant that is a product distribution entity) on hardware 152 owned, controlled, or operated by one or more participants 150: an inventory management system coordination component 156, a product data acquisition and delivery component 158, a product data translation component 160, a platform coordination component 162, an analytical component 164, a product data aggregation component 166, a database component 168, a communication component 170, the confidentiality enforcement component 171, a web browser component 172, and other components.

The particular components running on the hardware of the different participants can vary widely. When the participant is a product distribution entity, components will generally include at least the inventory management system coordination component, the product data translation component, the platform coordination component, and the communication component. For some product distribution entities that use inventory management systems having limited functionality, the components of the platform running on the participant's hardware could also include at least the product data acquisition and delivery component and the product data aggregation component. When the participant is not a product distribution entity (for example, a third-party supplier or user of product data), the components running on the participant's hardware could include at least a product data translation component, a platform coordination component, an analytical component, a product data aggregation component, a database component, and a communication component. Other combinations are also possible.

Components of the platform running on the central server and components of the platform running on equipment of the participants can communicate with one another through any communication network such as the Internet.

Certain components may be run on either or both of the platform server and the participant's hardware including, for example, a product data translation component, an analytical component, a product data aggregation component, or a database component. In some cases, the functions performed by these components can be performed cooperatively between components running on both the server and the participant's hardware. In some instances, the functions can be performed either only at the platform server or only at the participant's hardware.

Therefore, in some implementations, some functions of the platform can be performed cooperatively between components running on the central server and components running on the participant's hardware. For example, product data received, stored, and used by the platform can be maintained as records in tables of a database managed by a database component 120 (at the central server) or a database component 168 (at the participant's hardware). Maintenance and management of such a database can be handled solely at the server, solely at the participant's hardware, or at a combination of the server and the participant's hardware. A variety of analytical functions and the outputs of the functions can be provided by the platform either solely by the analytical component 112 running at the server, solely by analytical components 164 running at the participants, or by a combination of analytical components running at the server and the participants. The performance of a given analytical function can be split. The function of aggregating product data also can be performed solely by a product data aggregation component 118 at the central server or a product data acquisition and delivery component 166 at the participant's hardware, or at a combination of the central server and the participant hardware. Techniques for controlling access to components of the platform running on the central server and on the participant's hardware can be shared by a participant account component 106 or similar component at the participant hardware or can be performed primarily on one or the other. Similarly, the protection of confidentiality of product data fields can be controlled either by the confidentiality enforcement component 116 at the central server or a confidentiality enforcement component 171 at the participant hardware or a combination of both.

Product data acquired or stored in the inventory management systems of product distribution entities are typically expressed in a variety of proprietary formats that are incompatible with one another. The platform defines a common or canonical protocol for expressing product data acquired or stored at any participant or maintained or used for any purpose at the central server. Translations of product data back and forth between proprietary protocols used by proprietary inventory management systems and the common or canonical protocol used in some functions of the platform are performed by the product data translation components 110, 160 running at the central server or the participant hardware.

Here we describe certain functions and relationships among the components of the platform in more detail.

Central Server Communication Component

The communication component 122 provides the features necessary or useful for the central server to communicate with any type of participant or user through a communication network such as the Internet. The communication component 122 is configured to be able to function with any type of communication protocol including cellular and other wireless protocols. The communication can be made directly between the communication component 122 and a corresponding communication component in the participant hardware using typical Internet protocols. In some implementations, some of the communication between the central server and the participant can include use of the Web server component 114 at the central server and a corresponding Web browser at the participant. In such cases, the Web server component and the Web browser component can communicate through the corresponding communication components.

Central Server Web Server Component

The Web server component 114 serves webpages through the communication component to the participant Web browser using, for example, product data stored in the database component 120 for product data provided by the product data acquisition and delivery component, or a combination of both. The Web server component 114 also can provide data to the product data acquisition and delivery component for processing there. The Web server component communicates with the participant account component to manage the authentication process and changes to participant accounts, for example. The Web server component also interacts with the confidentiality enforcement component 116 for purposes explained below.

Central Server Participant Account Component

The central server participant account component 106 maintains accounts for participants and individuals representing participants, including product distribution entities and other participants. Participants and individual users can maintain profiles and authentication credentials using this component. When a participant or individual user logs in through a web browser and is authenticated, the participant or individual user is given access to authorized portions of the database component and functions provided by other components running on the central server, such as the analytical component. The participant account component also interacts with the confidentiality enforcement component to provide controls, based on the participant account and participant profile, to protect the confidentiality of certain kinds of participant information and product data.

Central Server Product Data Acquisition and Delivery Component

The product data acquisition and delivery component 108 manages interaction through the communication component 122 with the participant 150 for the purpose of acquiring product data that has been stored or is being generated at the participant hardware for the purpose of delivering product data to the participant that is been stored in the database component 120 and processed by various components at the server. Product data acquisition and delivery can be done by the product data acquisition and delivery component polling or being polled by the participant hardware periodically for product data in order to keep the product data at the central server or the participant, or both, current, complete, and accurate. In some implementations, the participant hardware actively sends product data to the product data acquisition and delivery component periodically without being polled. Similarly, the server can actively send product data to the participant without being polled. Delivery and receipt of product data can also occur at any time as product data changes or is generated at the participant hardware or is processed and stored in the database component at the server. In some cases, batches of product data can be delivered to or received by the product data acquisition and delivery component. This could occur not only in connection with polling, but also at particular times when a new participant has been added to the platform or has made significant changes in its hardware or its approach to gathering, processing, and delivering product data, or when the server has acquired volumes of additional product data or has changed its approach to processing the product data.

Product data acquired by the product data acquisition and delivery component can be stored in the database component 120 in the form in which the product data is received, without further processing at the central server. In some instances, the received product data can instead or additionally be delivered to the product data translation component 110.

Central Server Product Data Translation Component

The product data translation component 110 can receive product data directly from product data acquisition and delivery component 108 or from the database component 120. The received product data can be, for example, raw product data received from the participant hardware and untranslated according to a canonical format of the kind discussed later. The product data translation component 110 can perform the translation of received product data or product data stored in the database component directly and completely into the canonical format or can perform a partial translation to be completed at a later time. The result of the operation of the product data translation component will be fully or partially translated product data that is then stored in the database component. For some purposes, the product data translation component 110 can perform translation from the canonical format partially or fully back to a raw (e.g., proprietary) data format used by a participant's hardware.

Central Server Product Data Aggregation Component

For a variety of purposes and uses, including protecting the confidentiality of particular product data of particular participants, the product data aggregation component 118 manages the accumulation, assembly, and compilation of product data across a variety of different parameters. For this purpose, the product data aggregation component fetches product data from the database component 120, aggregates it in accordance with relevant aggregation rules based on the parameters, and returns aggregated product data the database component for storage and subsequent use in delivery to participants. The parameters according to which aggregation can be done can include time periods, geographical areas, product categories, product manufacturers, product model numbers, product serial numbers, product units, stages of product distribution in the product distribution chain, groupings of product distribution entities, and other parameters, and combinations of them. Aggregation can span two or more of those parameters.

Central Server Database Component

The database component includes a database of tables of product data and tables related to participant accounts, among other things, and a database engine that enables reliable and secure storage and fetching of product data. The records and fields of the product data tables can be expressed in a wide variety of forms and formats. The stored product data records can include records expressed in raw or proprietary product data formats, such as formats used by participant hardware, records expressed in accordance with the canonical format, and records expressed in partially translated formats, or records expressed in other formats, or combinations of them. The stored product data records can also include records expressed in a wide variety of aggregations based on the parameters described above.

Central Server Analytical Component

The analytical component provides a wide variety of analytical devices, tools, algorithms, and approaches for analyzing, summarizing, manipulating, processing, and otherwise interpreting product data stored in the database. The analytical component can be configured and used by participants in participant users through web communications and also by users associated with the server or the hosting party through a user interface provided by the server. Among other things, the analytical component can be used to develop, train, and apply models, algorithms, and other analytical tools for understanding, recording, interpreting, and predicting inventories, demands, supplies, consumer behaviors, behaviors of product distribution entities and groups of them, behaviors of product distribution markets and sub-markets, prices and pricing and values of product units, product models, product manufacturers, time periods, geographical areas, and other parameters and factors useful to product distribution entities and other participants.

Central Server Confidentiality Enforcement Component

The confidentiality enforcement component of the central server manages functions that assure that product data of product distribution entities and other participants is treated in accordance with understandings and agreements with those entities and participants including with respect to confidentiality, aggregation, and security. As explained below, trust by product distribution entities and other participants of the servers, the platform, and the hosting party is an important feature of the operation of the platform, not only to protect against claims that product data has been improperly used or disclosed, but also as an important feature of the building of a comprehensive, complete, up-to-date, and accurate set of product data in the database.

Participant Components

In addition to the components running on the server, the platform can include components running on each of the participant's hardware. These components can be generated by the hosting party of the platform or by the participant or by a combination of them. Components that are generated by the hosting party can be distributed to the participants electronically and installed on the participant hardware by participant users or representatives of the hosting party. Generally, in addition to the other functions performed by these participant components (described below), they serve to provide an interface or conduit between proprietary systems typically used on participant hardware and the shared systems operating on the servers. In this respect one or more the participant components can have server-facing aspects and features configured to interact correctly with corresponding components in the server and participant-facing aspects and features configured to interact correctly with proprietary and other components, software, features, and aspects of inventory management systems and other systems operated by the participant on the hardware.

Participant Communication Component

As shown in FIG. 3, the communication component 170 of the inventory management system of the participant's hardware provides the features necessary or useful for the central server to communicate with the server through a communication network such as the Internet. The communication component 170 is configured to be able to function with any type of communication protocol including cellular and other wireless protocols. The communication can be made directly between the communication component 170 and a corresponding communication component in the participant hardware using typical Internet protocols. In some implementations, some of the communication between the participant and the central server can include use of a web browser component 172 interacting with the web server component 114 at the central server. In such cases, the Web server component and the Web browser component can communicate through the corresponding communication components.

Participant Web Browser Component

The Web browser component 172 receives webpages through the communication component 170 from the Web server at the central server. The web browser component 172 also provides an interface enabling participant users to control user profiles and product data confidentiality rules, to login and be authenticated into logout of the platform. The web browser component enables participant users to view product data received from the central server and product data gathered by the hardware and owned by the participant. In some cases (when the participant user has authority to do so) the participant user can alter, correct, enhance, update, and otherwise work with product data, including product data of the participant and product data of other participants. For this purpose, product data of the participant can be stored in the end fetched from the database component 168.

Participant Product Data Acquisition and Delivery Component

The product data acquisition and delivery component 158 is configured to manage interaction through the communication component 170 with the server for the purpose of delivering product data that has been stored in the database component 168 or is being generated currently at the participant hardware. Product data acquisition and delivery component also obtains and receives product data from the central server that has been stored in the database component 120 and processed by various components at the server. Product data acquisition and delivery can be done by the product data acquisition and delivery component polling or being polled by the server periodically for product data in order to keep the product data at the participant or the central server, or both of them, current, complete, and accurate.

Participant Product Data Translation Component

The product data translation component 160 can receive product data directly from product data acquisition and delivery component 158 or from the database component 168. The received product data can be, for example, raw product data generated or received by the participant hardware and untranslated according to the canonical format of the kind discussed later. The product data translation component 160 can perform the translation of received acquired product data or product data stored in the database component directly and completely into the canonical format or can perform a partial translation to be completed a later time. The result of the operation of the product data translation component will be fully or partially translated product data that is then stored in the database component. For some purposes, the product data translation component 160 can perform translation from the canonical format partially or fully back to a raw (e.g., proprietary) data format used by the participant's hardware.

Participant Product Data Aggregation Component

At the participant's hardware, product data aggregation component can perform similar functions to those described for the product data aggregation component in the server, with respect to product data of the particular participant. In some implementations, the product data aggregation component on the participant's hardware and the product data aggregation component running on the server can cooperate and share the tasks involved in aggregation. In some cases, performing aggregation tasks on the participant's hardware helps to assure the confidentiality of certain portions of the product data at the source rather than relying on the server to perform such aggregation.

Participant Inventory Management System Coordination Component

The inventory management system coordination component 156 coordinates interaction with other components, for example, existing components of the inventory management systems 154. The other components can include for example, point-of-sale systems (in the case of retailer product distribution entities), inventory control systems, order entry systems, shipping management systems, supply-side tracking systems, pricing systems, and a variety of other systems that control, store, and generate product data and information and data associated with product data or can make use of product data, and analyses of product data. Proprietary inventory management systems will typically require specific inventory management system coordination components designed to, on one hand, be able to interact properly with those proprietary systems, and on the other hand, be able to interact with components specifically shown in FIG. 3. Therefore, the platform can be seen as including, in some implementations, not only the server and the components running on, but also special purpose components created for and running on existing inventory management systems. The special purpose components can be distributed electronically and installed by participant users or by representatives of the hosting party.

Participant Database Component

The database component 168 running on the participant hardware includes a database of tables of product data, among other things, and a database engine that enables reliable and secure storage and fetching of product data. The records and fields of the product data tables can be expressed in a wide variety of forms and formats. The stored product data records can include records expressed in raw or proprietary product data formats, such as formats used by inventory management systems running on the participant hardware, records expressed in accordance with the canonical format, and records expressed in partially translated formats, or records expressed in other formats, or combinations of them. The stored product data records can also include records expressed in a wide variety of aggregations based on the parameters described above. The database component 168 can provide a staging area and in some respects a replication of some or all of the participant's product data that is communicated back and forth with the server. In some implementations, the database component 168 and the database component running on the server can cooperate and share the task of managing portions of the product data used by the platform. In some applications, splitting these tasks can enhance the security and confidentiality of product data of a participant.

Participant Analytical Component

The participant analytical component 164 can provide functions and features similar to those described with respect to the analytical component running on the server. In some applications, the analytical components at the server and at the participant hardware can split functions, features, and tasks, can replicate functions, features, and tasks, and can operate cooperatively to perform analyses. In some respects, splitting functions, features, and tasks may enable more effective protection of the security and confidentiality of product data of a given participant. The cooperative operation may also save time and computational resources.

Canonical Protocol (Semantic Layer)

As indicated above, a useful feature of some implementations of the platform is that it translates product data back and forth between (a) varied and incompatible proprietary and other forms, formats, or protocols of expression used by product distribution entities and other participants and (b) a canonical or common or shared format of expression used on the server. By having center format for use with product data on the server, a variety of tasks become simpler, easier, more accurate, more timely, and more effective including, for example, storing product data, cleaning up product data, aggregating product data, and analyzing product data. We sometimes refer to the canonical or, or shared format as a semantic layer. Said another way, the semantic layer abstracts into a common format of expression, the disparate ways in which product data and other data are expressed in proprietary formats, fields, and records, at independent, distributed, proprietary POS and other inventory management systems hosted by disparate, independent, sometimes competitive product distribution entities. Significantly, in the aggregate the product data maintained centrally in the canonical format can represent a comprehensive, universal representation of all of the product data for all products at all stages of a distribution chain of a product market (or even of an entire consumer or commercial economy). And the global product data (and aggregations, analyses, portions, or insights about the product data) can be made available to one or more of the product distribution entities along the distribution chain.

Universal Database

Just as the platform can host, maintain, regulate, enforce, and encourage the use of a canonical or common or shared format of expression for product data, the platform maintains a database structure (e.g., one or more databases at the central server, at the participants' hardware, or a combination of them) for product data that can represent and embody a single universal database of product data across multiple or all product distribution entities, distribution chain entities, and products for a product market or multiple product markets. As noted earlier, the database structure can be implemented as a single database on the central server or as a distributed database among a set of servers, or in a variety of other arrangements.

Applications

A wide variety of applications of the platform are possible and useful. Although the platform can be applied to an entire product distribution chain, or even to an entire market for all physical products, typical applications focus on particular (and sometimes limited) portions of distribution chains having scopes defined by, for example, geography, product category, product model, product manufacturer, time, stage, competitor grouping, and others, and combinations of them. In some examples, described below, the platform is applied to the stage at which retail products are distributed to retail customers in related local areas. In some instances, the platform could be applied in a similar way to other individual stages of distribution chains, such as a distributor stage, a wholesaler stage, a manufacturer stage, or others. The platform could also be applied to combinations of stages of the distribution chain such as the combination of distributors and their retailer customers. Virtually any combination of participants could be treated together by the platform to improve the efficiency of their portion of the distribution chain. For example, all of the wholesalers, distributors, and retailers in a metropolitan area who handle small kitchen appliances could be treated together as a product distribution subsystem of interest.

The platform has a wide range of applications in a variety of product markets and distribution chains, for a spectrum of product distribution entities, and for various scopes of geography. The applications can also extend to participants other than product distribution entities. Applications may be useful in any context in which a product distribution entity or other participant can acquire or provide product data or can make use of product data. Especially valuable are applications in which the product data can be provided or used for the purpose of efficient inventorying or delivery of products, product ordering, supply analysis, prediction of customer demand, prediction of supply capability, and other activities associated with efficient operation of product distribution entities and the distribution chain.

Retail Application

Figure 7:
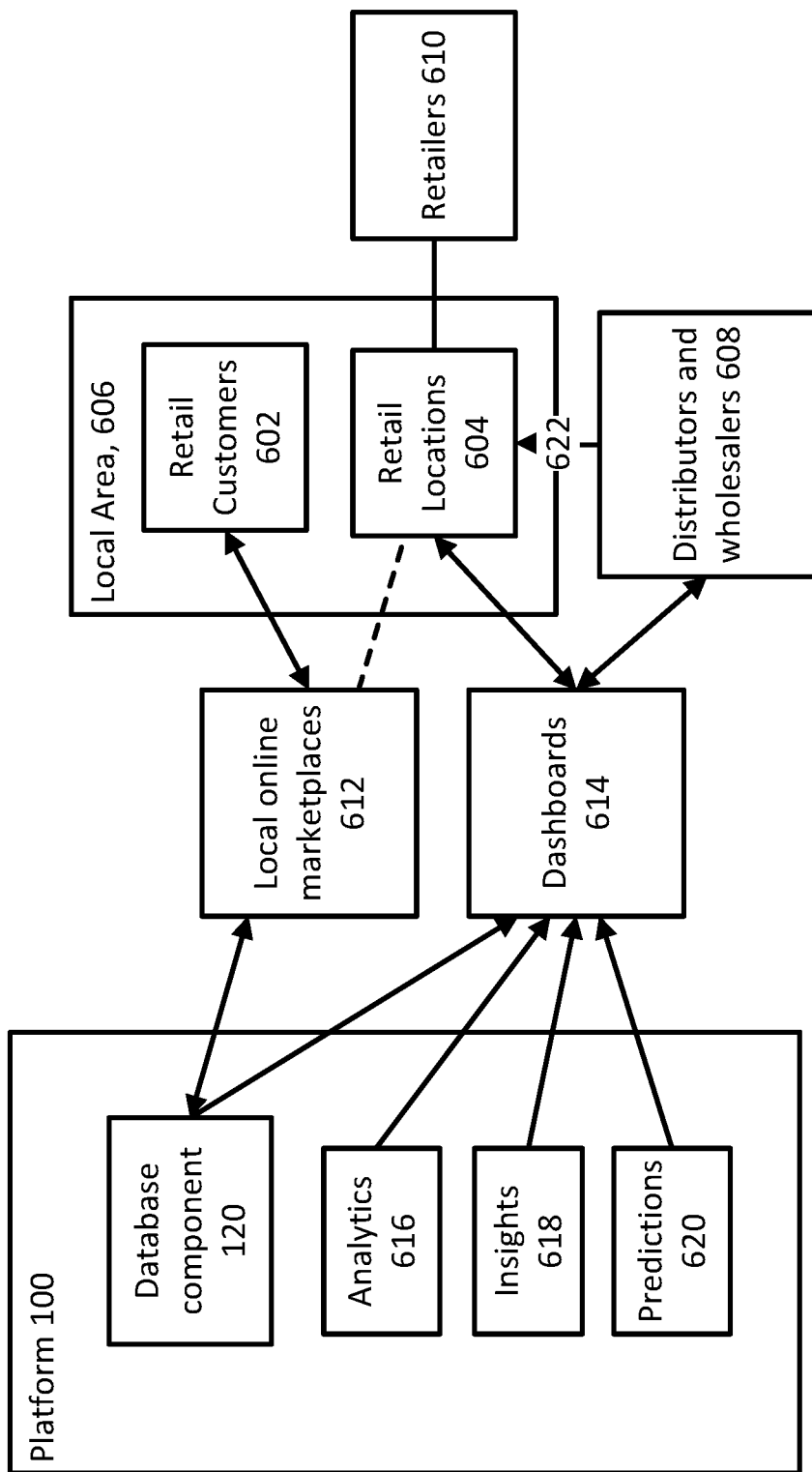

As shown in FIG. 7, here we describe example applications for retailers 610 and their retail locations 604, retail products, and retail customers 602 (as an example of end consumers). Although the description focuses on such applications, many of the features described here (and combinations of them) are also relevant broadly to a wide variety of other applications. For example, many of the same considerations and techniques can apply to physical products being distributed to commercial end consumers in a particular geographic area in a commercial context and to the product distribution entities engaged in that distribution.

Retailers and Retail Locations

Retailers typically operate as the final stage in a distribution chain for physical retail products in the sense that the end consumers for retailers are retail customers who are buying retail products to consume them rather than for further distribution. Putting aside large online sites, retailers commonly buy retail products from distributors or wholesalers at upstream stages of the distribution chain and stock them in brick-and-mortar retail locations (e.g., stores) where they are sold and delivered to the retail customers. Normally the retail customers physically visit the retail locations where they can browse for retail products of interest, buy them and take them. In some cases, the retail products are delivered from the retail locations to the retail customers without the retail customers making such a visit. Both methods can be referred to as broadly transferring the retail products from the retail locations to the retail customers.

Because retail customers often visit retail locations, each retail location tends to serve a limited local area 606. The local area has a boundary defined so that retail customers situated within the boundary can reach retail locations by trips that requires no longer than a threshold time or a threshold distance or both (e.g., there is a threshold proximity). Sometimes, a retail customer cannot find a retail product she wants at a particular retail location and may then travel to one or more other retail locations within (or beyond) the local area to locate the retail product.

In some cases, retailers are large entities operating chains of retail locations across broad geographic areas. In some instances, retailers are small entities operating individual retail locations serving neighborhoods or small locales.

Large Online Retail Sites

Large online retail sites (such as amazon.com, zappos.com and alibaba.com) make retail products easier to find by enabling retail customers to shop online, that is, search for, identify, and then buy the retail products without traveling to a retail location. The bought retail products are then delivered to the retail customer, which typically takes a day or two or more. Before delivery, the retail products are held in inventory in very large semi-automated warehouses owned or controlled by the large online retail sites. Complete, accurate, and current product data for products at the warehouse can be generated, maintained, and used to assure that retail products represented by the online site as being available are actually available for delivery. By offering a very wide catalog of products, easy and effective ways to search the catalog online and order the products, and accurate availability information, the online retail site can satisfy online retail customers even though delivery of the retail products is not immediate.

Large online retail sites directly compete with chain retailers, local retailers, and retail locations. Local retail locations are often small businesses serving local communities which make them appealing to nearby retail customers. Yet retail customers appreciate the very broad selection, convenience, and curation that large online retail sites provide. This effect has caused failure of small retail locations in many communities. Large online retailers empower retail customers, e.g., based on reviews, price comparisons, and other features. Local stores, by contrast, have been characterized by inefficiencies that also affect upstream stages of the supply chain. These inefficiencies are revealed by key questions: When a retail customer shops in a local retail location, how does she know that the price she's paying for the sweater she's purchasing is the best price in town? How does the local retail location know which sweaters to stock and how many of each, including the exact colors and sizes, based on the local shopping behavior of that retail customer (and many like her)? How does the distributor know exactly which sweaters to supply, how many, and when to deliver them to (fulfill orders for) that specific retail location? How might distributors and local retailers cooperate to provide just-in-time delivery of retail products to local retail locations based on shopping behaviors of local retail customers?

Local Retailer Online Sites

To compete with these advantages of the effective online presence enjoyed by large online retail sites, local retailers sometimes offer their own limited local retailer online sites associated with their retail locations. The retail customer of a retail location owned by the retailer can then browse for the product on the local retailer online site to search for and locate products sold by the retailer at a particular store. The retail customer then can travel to the store intending to pick up the product. However, the retail customer may find the product out of stock at the retail location because of incorrect inventory information (product data) supporting the local retailer online site. After experiencing this situation more than once the retail customer may become skeptical of the accuracy of the inventory at particular retail locations as indicated on the local retailer online site and may resort to the annoyance of calling the retail location to confirm that a product is available. In any case, because such local retailer online sites are not offered by many retailers, the customer cannot compare prices across retailers without going to their respective retail locations to see what is available and at what prices.

Data Inaccuracies on Local Retailer Online Sites

The accuracy of a local retailer online site depends on the accuracy of its product data. The information presented on the local retailer online site may be wrong because the local retailer online site may not be connected directly to the store's or retailer's inventory management system. Then the inventory listed on the local retailer online site as available for sale must be updated manually by the store staff. Should the staff forget to update the inventory regularly to reflect what is available or perform the updates incorrectly, or should a particular item sell out quickly before the staff are able to remove it from the local retailer online site, then the list of what is available for sale becomes inaccurate.

Inaccuracies in inventory presented on the local retailer online site can also arise when the retail location or the retailer uses several different, non-integrated, inventory-related applications as part of its inventory management system. For example, the retail location or the retailer may use one application for managing its inventory and another for its POS transactions. Operating multiple applications for a single retail location adds to the burden on the store staff to ensure that inventory information of all applications is consistent, complete, current, and accurate.

What Consumers want

In other words, large online retail sites typically require retail customers to wait for delivery, but their broad selection and other features undercut the retail customer's interest in patronizing locally owned retail locations or the retail customer's brand loyalty for local retail locations owned by favored chains; however, the product data presented on local retailer online sites for local retail locations is limited to particular local retail locations and is often wrong.

At least some retail customers would benefit from access to individual or aggregated local retailer online sites presenting accurate, complete, and current product data for individual retail locations and for a full range of separately-owned retail locations within a threshold distance or threshold travel time of the places where the retail customers are situated. Such local retailer online sites would enable the retail customers to use product-centric keyword searching across a broad and diverse range of products, identify local retail locations at which desired product are reliably known to be available, and then travel immediately to the retail locations to pick up the products.

Because individual local retail locations tend to be small, to offer only limited ranges of products, and to suffer from out of stock problems, achieving that goal would benefit from a system that could know, aggregate, and present current product data about the products carried by and in stock at multiple independent local retailers.

The Local Online Retail Marketplace

In some applications, the platform can host and provide one or more local online retail marketplaces for or on behalf of individual local retail locations and aggregations and groups of local retail locations serving local areas. The marketplaces enable retail customers situated in those local areas to search for products at individual retail locations and across multiple retail locations in the local areas. The retail customers can confidently identify locations at which desired products are known to be available, and immediately (or within a short time-frame, such as an hour, three hours, six hours, eight hours, or twelve hours, as examples) either pick up the products or have them delivered. The local online retail marketplaces can be served as rich full-functioned user interfaces through browsers on computers or through mobile applications on mobile devices.

The local areas served by one or more local online retail marketplaces can be defined in a variety of ways. In some cases, the local areas can be defined based on aggregations of retail locations that are geographically clustered, such as in business districts, malls, or highway segments. In some examples, local areas can be defined by geographic political boundaries, such as towns or counties. In some instances, local areas can be defined in terms of a threshold distance or a threshold travel time, or both, from a given location, such as a five-mile radius from the center of a city. Combinations of such local areas can also be used. The area covered by local online retail marketplaces can be determined dynamically, for example, at the time when a retail customer opens a browser window to interact with a marketplace or continuously while the customer is interacting with a marketplace. The area covered can be determined automatically without participation by the retail customer or the retail customer can select the area or express preferences that affect the area covered.

Sometimes local areas can be defined for each retail customer individually, such as an area within a threshold distance or threshold travel time from the specific retail customer's apartment building. In other words, the user interface presented to each retail customer can be (but need not be) unique to that customer in presenting information about products available in local retail locations that are within a threshold distance or threshold travel time determined for that customer.

A variety of definitions can be used for the threshold time (say, 10 minutes, 30 minutes, or an hour, to name three examples, as well as the examples previously noted) or for the threshold distance (say, one-half mile or one mile or 5 miles or 50 miles, or other distances). The local online retail marketplaces can enable a retail customer to choose or specify a threshold time or a threshold distance or ranges of them or combinations of them as a way to affect the local area covered by a given local online retail marketplace.

There can be one or more local online retail marketplaces provided by the platform. In some implementations, a single local online retail marketplace would be available online to all retail customers for all local areas in a country or state or province, for example. This arrangement would allow a retail customer to choose the local area of interest. In some cases, the platform uses product data to serve multiple local online retail marketplaces for use by respective groups of retail customer users depending on their locations. In some applications, as noted above, each retail customer would be served a personalized local online retail marketplace based on her location and other personalization and demographic factors such as product categories of interest, age, gender, income, and others. The platform could enable a retail customer to adjust the content and presentation of a personalized local online retail marketplace based on expressed preferences.

In some cases, the platform could serve only a single local online retail marketplace for a particular retail location at a time. The retail customer could navigate from one such local online retail marketplace to another within a local area to browse for and find products of interest. In some instances, the platform could serve local online retail marketplaces that are not based on retail location but rather are focused on a local area. For example, the platform could enable a retail customer to use key word searching for products available at any participant retail location within a defined local area. When results of the search are displayed, for example, for Kitchen Aid food processors, the retail customer could then be shown the names and addresses of the retail locations within the threshold proximity where the product is known to be available.

To be able to present such local online retail marketplaces, the platform acquires, organizes, stores in the database component 120, and aggregates product data for more than one (e.g., many or all) of the retail locations in a given local area in a manner to keep the product data current, accurate, and complete.

In effect, the platform uses deep and broad available product data across competitive retail product distribution entities to enable retail customers to shop for available products at one or more (or all) retail locations in a relevant local area (for example a local area within a determined or selected threshold proximity). In that way, the platform can present a breadth and depth of retail product inventories comparable to those offered by centrally inventoried product distribution entities such as Amazon. And the platform can identify retail locations at which the products are available within a threshold proximity that makes transfer of the products to the retail customers within a matter of minutes or hours or miles feasible and convenient.

An additional significant aspect and benefit of the platform is in enabling upstream product distribution entities, such as wholesalers or distributors 608, to have knowledge of the in-stock state (and predictions 620 of the future in-stock state) of some or all products for some or all local retail locations in a local area. Said another way, the platform makes more efficient and effective fulfillment possible. Distribution of products (fulfillment 622) from upstream distribution stages to retailer locations can be done at the right times and in the right quantities to match predicted in-stock states. Instead of being held in inventory by the wholesaler or distributor until no longer in stock at its customer retail locations, products can be distributed to the final stage of the distribution chain (the retail locations) in time to maintain in-stock states. Then because retail locations are essentially never in an out-of-stock state for any product, assured elapsed times for transfer of the products to the retail customers can be reduced to minutes or hours rather than days.

With all in-demand products being distributed to and available at the retail locations in the local area, in some implementations, a delivery service can provide delivery directly from the retail locations to the locations of the retail customers within a threshold time. The hosting party of the platform could partner with a last-mile distribution provider (e.g., Uber Eats, Postmates, Lyft, USPS) to move products from the retail locations to retail customers. Retailer locations could also mail products directly to retail customers or be directly responsible for delivery (similar to a local pizza shop). And retail customers could travel to the retail locations for immediate pickup of products.

Similar activities and advantages can be achieved between upstream stages of the distribution chain using similar hardware and software. For example, the platform could provide relevant current product data and demand predictions for manufacturers with respect to current and predicted in-stock states of their wholesalers and distributors.

Based on the product data provided by the participants of the platform, the central server of the platform always maintains or has access to accurate, complete, and current product data reflecting the inventory in stock and available for delivery at each of the physical retail locations of all of the retail platform participants, for example, within a given local area. In addition to being used to support the local online retail marketplaces, the product data held in the central server of the platform can be used to predict demand for products in the local area and be made available to other participants for a variety of purposes.

Analysis and Insights

In addition to making quick-delivery purchases by retail customers in local areas easy, the local online retail marketplaces hosted by the platform can create value by aggregating, analyzing, deriving insights about retail customer behavior, and providing product data, aggregate data, predictions 620 of demand, analytics 616, and insights 618 (including market basket insights) to participants. Market basket insights include, for example, information about which retail customers in a local area buy which products, in which combinations, and in what quantities, and how different products and groups of products are included in the purchasing habits of consumers in a local area.

Participants who may buy or otherwise receive such product data or other data, predictions, analysis, and insights include retailers, retail locations, and other product distribution entities in the distribution chain. For example, such data, analysis, and insights sold on a subscription or a transactional basis can be valuable to retailers who do not maintain their own local online retail marketplace (sometimes called "offline retailers"). Based on such data, predictions, analysis, and insights, offline retailers can make better determinations of which products to stock at their retail locations. Distributors and wholesalers also can benefit from acquiring such data, predictions, analysis, and insights by using them to determine when to deliver particular products to their retailer customers (fulfillment). Manufacturers, in turn, can determine which products to produce and in which quantities for supply to their distributor and wholesaler customers. Using such techniques, costs can be kept lower for the retail customers, retailers, and other product distribution entities in the distribution chain. The retail locations, retailers, and other product distribution entities can access the data, analytics, insights, and predictions through online dashboards served from the platform.

Benefits of the Local Online Retail Marketplaces

The local online retail marketplaces provide at least the following other advantages.

By acquiring product data for many or all POS and other inventory management systems of retailers and retail locations (including previously offline retailers) in one local area, groups of local areas, or all local areas, the platform and its local online retail marketplaces allow retail customers to search, compare products, and order across the available products of those retail locations in real-time. The local online retail marketplaces can provide the consumer as much convenience and curation as traditional large online retail sites (e.g. Amazon). Unlike the large online retail sites, the products being shopped for are known to be available at retail locations in the local areas, or are otherwise available for pickup or delivery, immediately or within a brief period.

By providing retailers (and other product distribution entities) with product data, predictions, analyses, and insights into behavior of retail customers within a local area, the retailers will have the capability to stock their shelves with the exact products that match local retail customers' needs and wants. The local online retail marketplaces will collect, aggregate, and anonymize product data indicative of which products local retail customers shop for and how they shop for them. By providing that product data, predictions, analyses, and insights back to retailers in a useful format (e.g., through a real-time dashboard), offline retailers will have the same capabilities to curate and match products to local retail customer demand as traditional large online marketplaces have done. By enabling suppliers to provide just-in-time delivery, the platform ensures that retail customers' favorite products will be in stock based directly on known retail customers' shopping behavior. In essence, the platform can enable a completely efficient distribution chain based on product data about real-time retail customer behavior across different incompatible POS and other inventory management systems, retailers, and geographies.

The platform enables the retailer to determine which products to sell and when and at which retail locations to sell them to retail customers in a local area, enables the supplier or wholesaler to determine which products to deliver and when and to which retail locations to deliver them across its retailer customers, e.g., a set of retailers, and enables the manufacturer to know which products to make and when and where to make them. Using real-time integration of received product data, the platform provides local online retail marketplaces through which otherwise offline retailers can operate online without effort.

Significantly, the product data, analyses, and insights provided by the platform through the dashboards are driven from and based on transactions at the final stage of the distribution chain, that is, information derived from the retail customers. The platform then provides corresponding product data at upstream stages of the distribution chain in real-time. The platform transforms existing proprietary and separate POS and other inventory management systems into hubs of product data and thus transforms what was once a fragmented and inefficient offline retail stage of the distribution chain into an efficient and transparent online retail stage. Retail customers will no longer miss out when a favorite item appears on retail location shelves. Retailers will no longer need to carry overstock items that don't sell. Suppliers will no longer need to operate in the dark about the retail performance of their products.

Incentives to Participation

Product distribution entities will choose to be participants in the platform and to buy real-time product data, analytics, insights, and predictions from the platform for at least the following reasons. By having access to real-time product data (e.g., inventories) of multiple retailers and retail locations, including purchase rates, product distribution entities can provide just-in-time delivery of products (fulfillment) to retailers and retail locations. By having access to real-time pricing data of a given product (or groups of similar products) across multiple retailers aggregated for a local area, product distribution entities will know how to dynamically price their products to the retailers. Product distribution entities can obtain insights not only into what products to distribute, but also into how, when, by whom, and in what quantities products are being consumed. The insights can also include which products are complements of one another or substitutes of one another and which sub-categories of products are more popular than other sub-categories in a local area.

Manufacturer participants in the platform can receive real-time product data about aggregated retail customer shopping behavior at retail locations across multiple local areas. With these insights, manufacturers can determine what products to make and when to make them based on the historical, real-time, and predicted shopping behavior of retail customers across different local areas.

The frictional cost for an end consumer (e.g., a retail customer) associated with finding a product quickly and nearby has enabled large online retail sites to build large retail businesses by having a broad range of products in stock at central warehouses and being able to get them to the customer within two days, for example. A holy grail for retailing is to be able to offer a complete, broad, and deep range of products and be able to deliver them or have them picked up locally within minutes or hours instead of days. The platform and the local online retail marketplaces facilitate this result at the retail stage of the product distribution chain. Similar uses of the platform can provide similar advantages at other stages of the distribution chain.

In some implementations, the platform and the local online retail marketplaces could eliminate the need for some kinds of physical retail locations in contexts in which retail customers do not need to browse in a retail location for products of interest. Such retail locations could be replaced with retail locations in lower rent districts yet within a local area. Such retail locations could take the form of local inventory locations from which pickup or delivery could be managed for a single retailer or across multiple competitive retailers and retail locations. A given retailer or retail location could specialize in a class of products and be situated in a lower-cost location rather than having a walk-in showroom in a higher cost location. Retail customers could go to a local inventory hub location for express pick-up of products, use a drive-through to receive the products, or have the products delivered.

No Sharing by Local Retail Locations of Product Data

In theory, retail locations in a local area could cooperatively and directly share their product data among themselves and with suppliers and wholesalers to achieve some of the benefits of the platform and the local online retail marketplaces. Yet, in reality, because they compete, the retail locations have motivations not to cooperate, for example, in sharing product data that captures details about retail customer behavior. This reluctance to share product data hampers efforts to analyze and develop insights on retail customer shopping behavior, both at an individual retail customer level and at an aggregated market level.

To fill in this gap of shared product data, some retail analytics companies attempt to collect and aggregate retail customer behavior data from individual retailers and retail locations. Doing so is hard and expensive because the analytics companies must visit many different retail locations and negotiate separate agreements to obtain their product data. In some cases, the retail locations and retailers may not be collecting the needed product data, forcing the retail analytics companies to install data collection systems. The collected data may not be updated in real-time making some of it inaccurate.

Retailer and retail location participants in the platform and the local online retail marketplaces and dashboards may be motivated by the ability to share real-time product data through the platform with their distributors or wholesalers in exchange for access to fully-automated local online retail marketplaces, just-in-time inventory fulfillment, and the ability to know exactly what products and the number of units of each product to stock on retail location shelves for the population of retail customers in the local area (as well as where and when to stock those products).

For example, access to the product data could be given to a distributor of one or more retailer participants. Such a distributor might otherwise have to build its own component of an inventory management system to track the inventory of its customers to predict the retailers' demand for products. Instead, the distributor's hardware can run simple data communication components enabling it to access the dashboards or other facilities of the platform and have immediate access to accurate, complete, and current product data across all of the inventory management systems of the retailers and retail locations that are or might be customers of the distributor. Retailer customers of the distributor are benefited because the distributor can plan its own inventory and manage deliveries of products to the retail customers (fulfillment) in the right numbers of units and at the right times.

Trust

The collection and distribution of product data by the platform and its local online retail marketplaces conform to tenets of trust, value, and transparency. The platform will establish trust with end consumer participants by providing convenience (e.g., for end consumers who are retail customers, "The local online retail marketplaces can provide me whatever product I want locally whenever I want it, without the delay typical of online retail sites") and curation (e.g., "On the local online retail marketplaces I can find the product I want, at the price I want to pay, from the retailer I want to patronize, and get it right away.").

For retailer and retail location participants, the platform and the local online retail marketplaces earn trust by offering sought after functions and features. By providing retailers with turnkey local online retail marketplaces that are essentially free to use and product-data-supported insights that enable the retailers to decide what products to sell and how to sell them, the platform establishes trust with the retailers and gains permission to access their private product data. Retailers who don't become participants in the platform stand to lose invaluable product data, analyses, insights, and predictions for retail customer behavior in the local area, be left to build their own online retail sites, and potentially lose access to their real-time local retail customer base. Conversely, by participating in the platform and the local online retail marketplaces retailers gain valuable product data, analyses, insights, and predictions, operate an automated (and free) best-in-class local online retail marketplace, and can present available products directly to online retail customers actively shopping for those products.

Value is created not only for retailers and retail locations, but also for wholesalers, suppliers, and manufacturers. By having a majority (if not all) retailers and retail locations as participants in the platform, the product data captured will become valuable to many product distribution entities. The platform can charge suppliers and manufacturers and other participants for access to real-time product data, analyses, insights, and predictions at the level of individual retail locations.

The platform operates transparently to each participant across the distribution chain. For every participant, such as an end customer or a retailer, the platform will reveal what data is being accessed, how it's being utilized, and why that's important for them. For instance, a retail customer will understand that by sharing his or her shopping behavior, the platform can curate and suggest new and better products. The retailer will know that sharing its product data will allow the platform to ensure that a best-selling product never runs out of stock.

At the platform, product data can be processed to aggregate and anonymize market basket data. In some implementations, retailers, suppliers, and manufacturers, among other participants, have no access to product data identifying how an individual retail customer shops, but will be able to see how an anonymized group of individual retail customers shop. The market basket data can be aggregated at various geographic levels corresponding to local areas (e.g., by zip code, city, state, or country or in other areas as discussed earlier). The product data shared with suppliers can be provided at an individual retail level or aggregated and anonymized at various geographic levels. For instance, the supplier could see product data revealing which products are running low in inventory (getting close to an out-of-stock state) at a specific retailer's location or at a level of a local area or regionally. In addition, the platform can provide product data that enables suppliers to deliver products just-in-time, potentially enabling an optimally efficient distribution chain extending from the manufacturer to the retail customer, based on real-time product data indicative of retail customer behavior.

A variety of techniques can be used on the platform to protect confidential product data and other information associated with participants.

In some examples, to acquire the product data, components running on the central server will poll components running on the participants' hardware to obtain the real time product data (e.g., inventory levels or transactions) and other product data for all products at each retail location and store that information in the database. Each retailer participant will own the data for its retail locations and will grant the hosting party of the platform a non-revocable license that allows the hosting party to aggregate, analyze, and distribute the data. At any time, the retailer participant may opt out of the product data collection. With respect to access, no entity outside the hosting party will have access to the database. The platform will share product data from the database and other information either using a report mode or using an authorized API for electronic delivery.

Participant connections to postgres databases require SSL encryption to ensure a high level of security and privacy. When deploying applications, the platform will encourage participants to take advantage of encrypted database connections.

Product data can be encrypted by customer applications to meet data security requirements. Customers can implement data storage, key management, and data retention requirements when developing applications.

Access by third party participants in the platform to product data, analyses, and insights can be done by a report produced by a participant API. The API can require SSL encryption and an access-controlled token. The token will only provide access to permitted information for the participant (there are no global tokens with access to all). The host of the platform controls the access-control tokens and can enable or disable them.

Implementations

Figure 4:
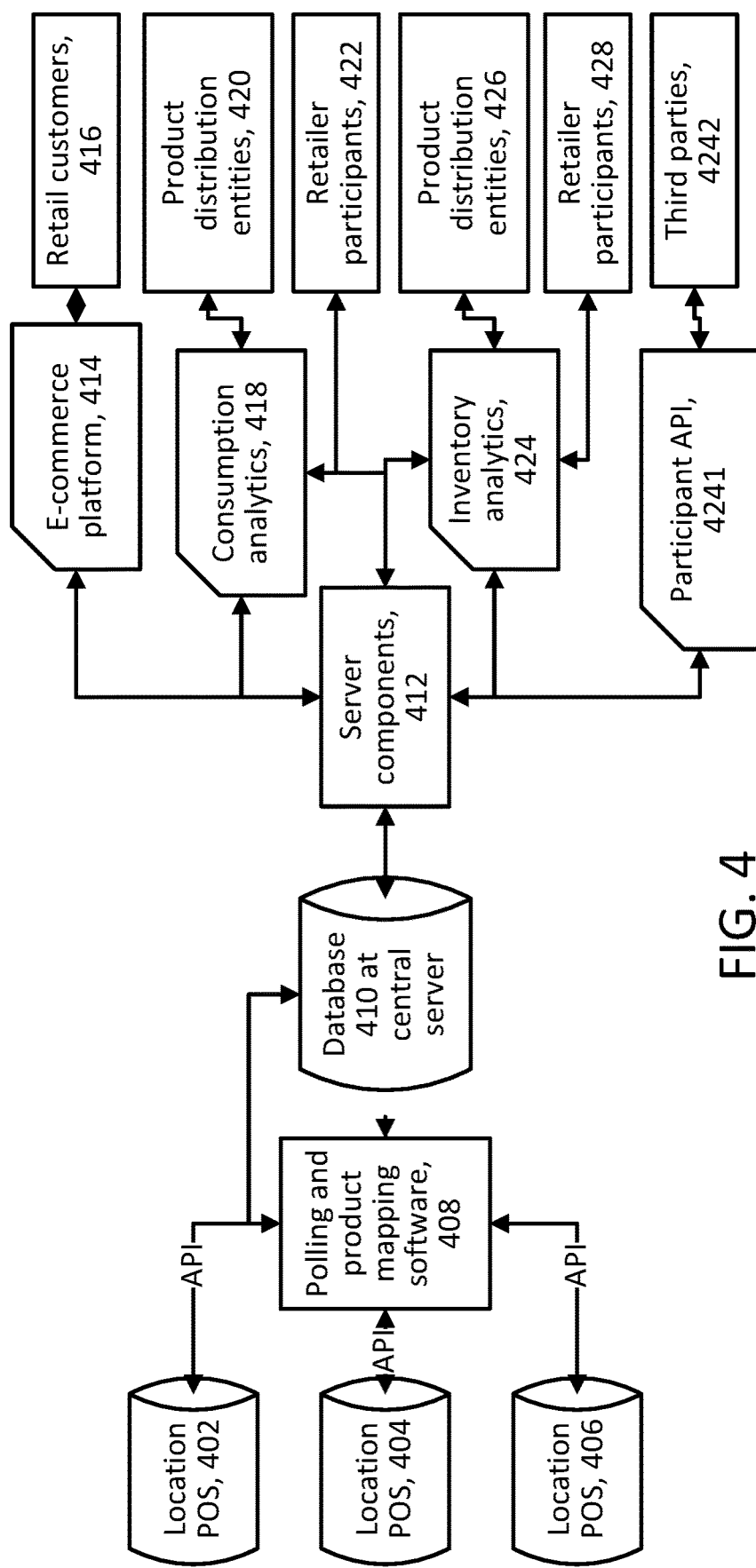
Figure 5:
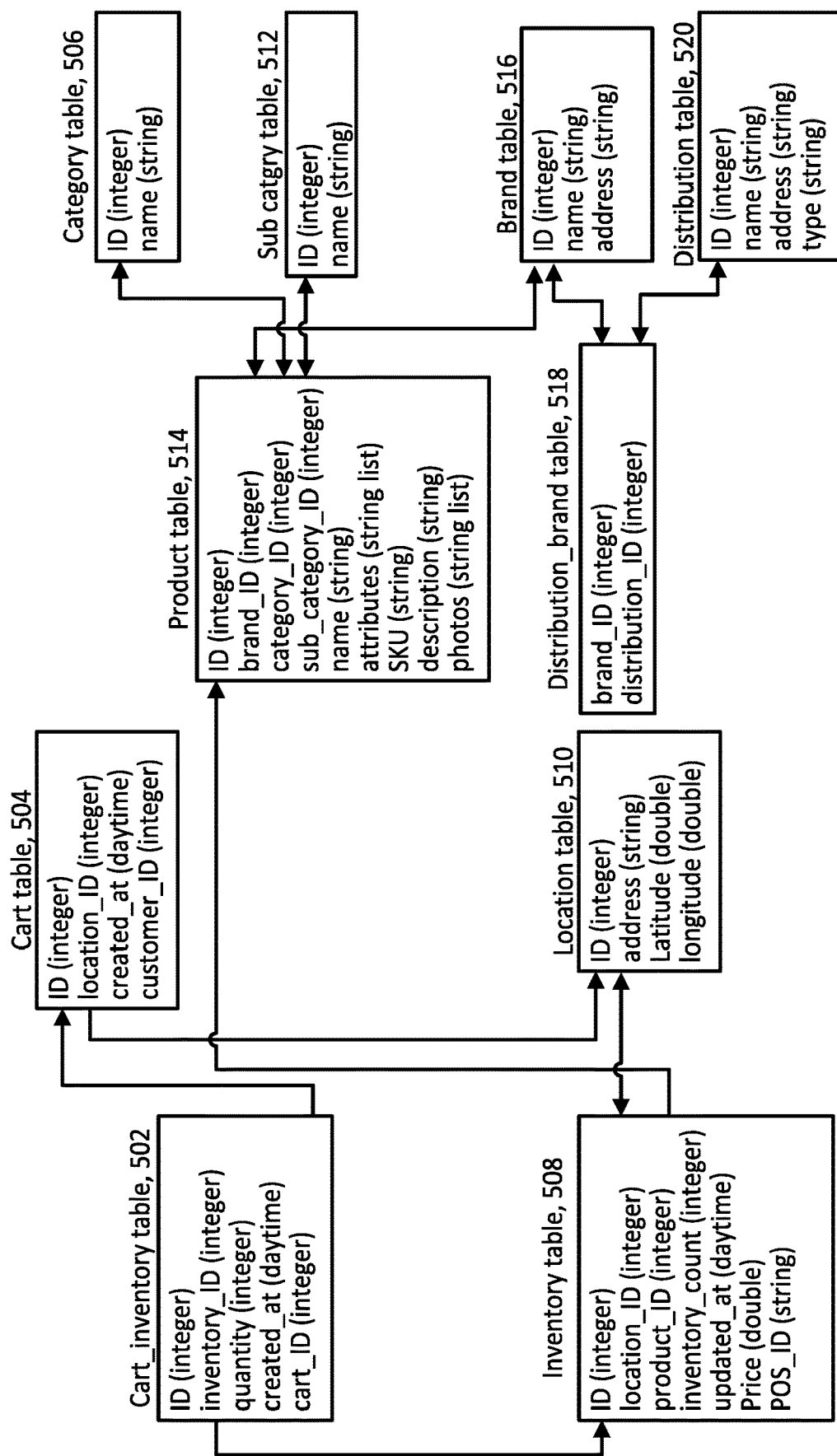
Figure 6:
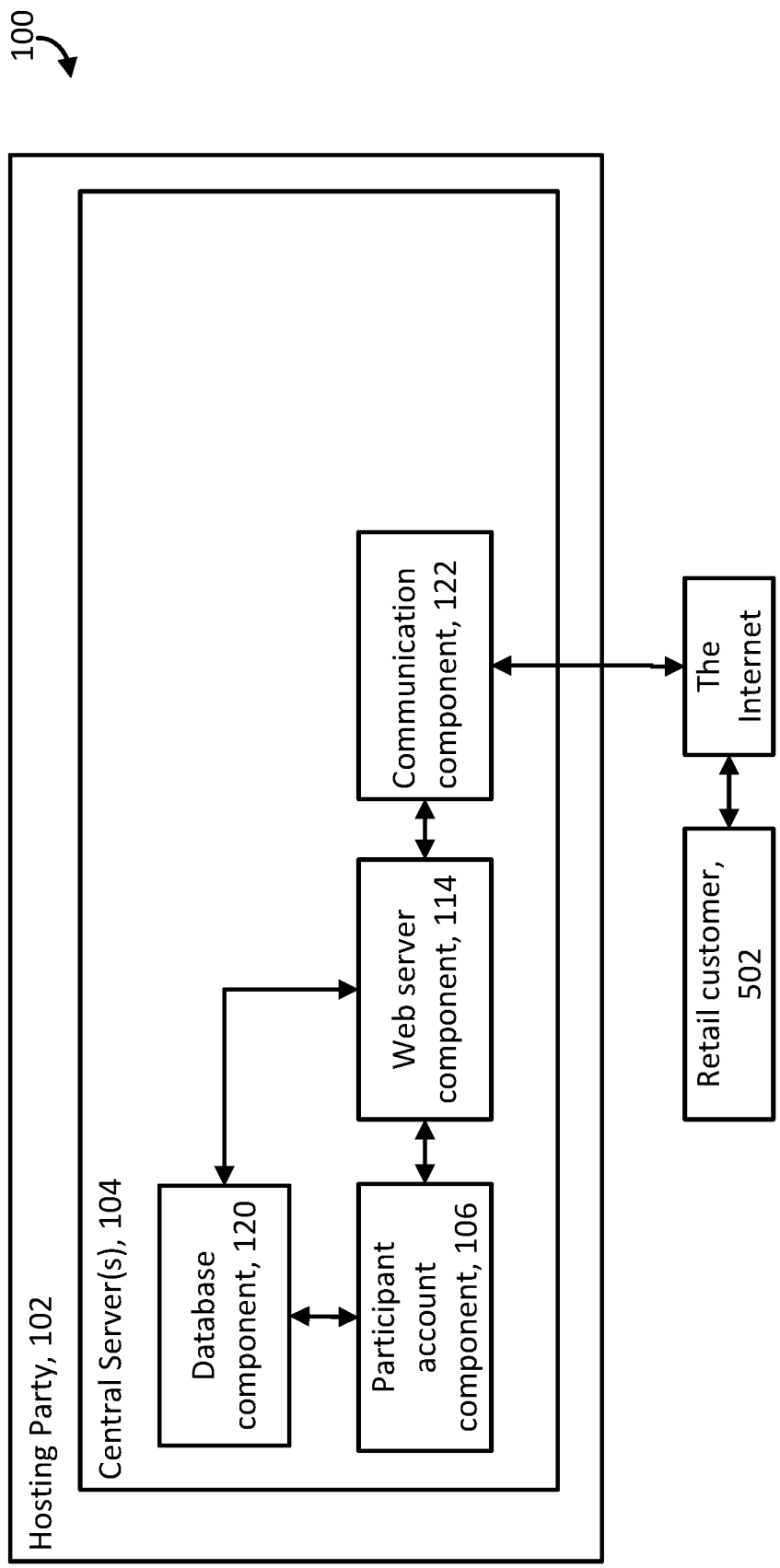

As shown in FIGS. 4 and 5, in some implementations of the platform, polling software 408 running at the server keeps an accurate account of all inventory (product data) counts across all retail locations and ties those inventory counts with product and brand representations in a product table 514 and a brand table 518. The local online retail marketplace (e-commerce platform) 414 tracks purchasing behavior at retail customer, retail location, market, and industry levels. Inventory analytics software 424 running at the server uncovers and predicts purchasing behavior based on (but not limited to) location, product, brand, category, subcategory, and customer base. This enables the platform to collect complete, accurate, timely product data from potentially all of the product distribution entities, delivery entities, and other parties associated with the distribution chain (e.g., all of the participants in the platform). The platform enables easy and predictive fulfillment of products by product distribution entities for retail locations based on analyzed consumption. Among other things, the platform can connect product distribution entities that distribute specific brands with retail locations that are looking to restock those brands based on real-time consumption of their retail customers.

Example Database Records

In some implementations, the product data can be maintained as records in the database component 410 of the server. In some cases, the fields of the product data records of the database could include at least the following:

retail location_id: Unique identifier for the retail location.

product_id: Unique identifier for the product within the platform; each product is assigned a unique identifier.

inventory_count: A current count of the units of the product at the retail location.

time stamp: The time when the count of units of the product was made.

location stamp: The location of the retail location, for example, its geographic coordinates.

product stamp: An identification of a product model or a product unit.

Polling and Product Mapping Software

As a retail location sells products in inventory (in an in-stock state) to retail customers 416, the polling and product mapping software 408 will update the inventory items associated with those products in an inventory table 508 as stored in a central database 410. The software integrates with the retail location POS systems 402, 404, 40 directly or indirectly through an API call or similar method to poll all active inventory (product data) at the retail locations. The polling software uses custom drivers to interpret the polled active product data inventory and then map (translate) the polled inventory items to their canonical product representations in the product table 514. The polling software uses a proprietary string distance algorithm to infer to a high probability the most likely canonical product representation in the product table 514. Once a match is determined the polling software creates or updates the inventory (product data) entry in the inventory (product data) table 508 through an API using the polled information. As a result, the records of the inventory table 508 reflect each retail location's active inventory counts (product data) and the table matches the inventory items (products) with their canonical product representations. All of these tables are stored in the central database 410. The polling software operates continuously to update the inventory product data to reflect the current actual inventory counts at the retail locations.

The mapping of inventory items (units of in-stock products) at the retail locations to their canonical product representations in the product table 514 enables any software, API, or other product data consuming entity or component connecting to the central database 410 not only to view the inventory counts, but also to match those inventory items with a standardized product library with inherited content in the product table describing the product. Content (e.g., fields of the product table) can include but is not limited to: name, category, sub-category, brand, attributes, SKU, description, and photos. The values for these fields are consumed and served to the local online retail marketplace and any other application or API coupled to the central database 410.

Consumption Analytics

Using real-time inventory product data, product descriptions, and cart data as powered by the polling software 408 and local online retail marketplace 414, analysis of the product data can be done at the level of a customer, a location, a market, or an industry, for example. These analytics 418 can uncover and predict purchasing behavior based on but not limited to location, product, brand, category, subcategory, and customer base.

Retail locations 422, 428 can use the results of the analytics to decide which products to carry based on predicted consumption.

Other product distribution entities 422, 426 use the results of the analytics to decide which products to manufacture, produce, or distribute, for example. based on retail customer consumption information reflected in the product data.

Inventory Analytics

Utilizing the actual current inventory, product, and cart data as received by the polling software and the local online retail marketplace, inventory analytics 424 can be done at a level of a customer, a location, a market, and an industry. These analytics can uncover and predict purchasing behavior based on but not limited to location, product, brand, category, subcategory, and customer base. Product distribution entities can use the results of these analytics to engage in "consumption based predictive fulfillment", that is, delivery of retail products at times and locations suggested by predictions of consumption by retail customers.

The distribution table 520 of the database component locations stores a record for each product distribution entity that will be notified of products that will need to be re-supplied or presented to retail locations for corresponding products that are predicted to require fulfillment (e.g., restocking) at those locations at identified times. The inventory analytics software notifies the product distribution entities of the inventory items (products and counts of products) that are expected to be out of stock based on predicted consumption. Those inventory items are associated with products in the product table 514. The products are associated with brands in the brand table 516, and those brands are associated with product distribution entities that distribute those products in the distribution table 520 and brands as located in the distribution brand table 518.

E-Commerce Platform

The e-commerce platform 414 (e.g., a local online retail marketplace) is supported by the server components 412, the database at the central server 410, and product data acquired by the polling software 408. The e-commerce platform can provide an accurate current menu of products and product counts at retail locations that are participants. The menu can be presented to retail customers through web pages of the local online retail marketplace enabling retail customers to create carts and place orders at participant retail locations. The products contained in the online carts are tracked and stored in the cart table 504 in the database of the central server. Each record in the cart table contains one or more cart_inventory entries that represents a purchased product.

In some implementations, the database component 410 is a cloud-hosted database at the server and is connected to other software and APIs through the server components 112 that are realized as a cloud hosted application. The server components 112 handle incoming queries for product data and other information in the tables of the database and creates, reads, updates, and destroys the necessary data in the tables of the database.

The database contains at least the following tables:

Product Table

The product table 514 contains a record for each unique product handled by the platform. A product can be, for example, any product can be a bought at a retail location and is associated with: a brand (e.g., a manufacturer of the product such as Kiva or Korova), a product category (e.g., edible, flower, tincture), and a product sub-category (e.g., baked goods, candies).

Product objects (e.g., records) contain at least the following fields:
   id (integer): An id of the product, unique within the entire platform.
   brand_id (integer): An id associated with a brand.
   category_id (integer): An id associated with a category.
   sub_category_id (integer): An id associated with a sub-category.
   name (string): A name of a table (e.g., Chocolate Chip Cookie, Watermelon Gummies).
   attributes (string list): A list of product attributes (i.e. 100 mg THC, 4 Pack)
   SKU (string): A globally unique SKU if available.
   description (string): A description of the product.
   photos (list string): A list of product photo URLs.

Category Table

Each of the records in the category table 506 defines category of products uniquely across all categories of products in the platform. In some implementations, a category is the top-level classification of a product. A category object (record) contains at least the following fields:
   id (integer): An id of a category unique within the entire platform.
   name: A name of a category.

Sub-Category Table

Each record in the sub-category table 512 represents an individual unique sub category of products handled by the platform. A sub-category is a low-level classification of a product. A sub-category object (record) contains at least the following fields:
   id (integer): A unique id of a sub category within the platform.
   name: A name of a sub category.

Brand Table

Each record of the brand table 516 represents an individual unique category (brand, manufacturer) in the platform. A brand represents the manufacturer of a product. Brand objects (records) contain at least the following fields:

id (integer): The unique id of the brand within the platform.
name: The name of the brand.

Distribution Table

Each record of the distribution table 520 represents a product distribution entity. Examples of product distribution entities include: manufacturers, distributors, wholesalers, and retailers, among others. Distribution objects (records) contain the following information:

id (integer): A unique id of a product distribution entity within the platform.
name (string): The name of the product distribution entity.

Distribution_Brand Table

Each record of the distribution_brand table 518 represents a relationship between a product distribution entity and a brand. If a product distribution entity manufactures, supplies, or distributes a brand, the relationship will be stored in this table. Distribution_brand objects (records) contain at least the following fields:

distribution_id (integer): This id refers to a distribution entry in the distribution table.
brand_id (integer): This id refers to a Brand entry in the Brand table.

Location Table

A record of the location table 510 describes a retail location in the platform. A retail location is, for example, a location that sells products to retail customers. Location objects contain the following:

id (integer): The unique id of the location within the platform.
address (string): The physical address of the location.
latitude (double): The latitude of the location.
longitude (double): The longitude of the location.

Inventory Table

A record of the inventory table 508 represents an inventory item in the system. An inventory item is, for example, a product in a retail location's inventory. The inventory object (record) contains at least the following fields:

id (integer): A unique id of an inventory item within the platform.
location_id (integer): An id referring to a location entry in the location table.
product_id (integer): An id referring to an entity entry in the entity table.
inventory_count (integer): A count of a current active inventory at a retail location.
updated_at (datetime): The last time the inventory item was updated.
price (double): The listed price of the inventory item at the retail location.
pos_id (double): The identifier of the inventory item in the retail location's POS system.

Cart Table

Each record of the cart table 504 represents a cart. A cart is a purchased or pending purchase at a retail location. The cart object (record) contains at least the following:

id (integer): The unique id of the cart within the platform.
location_id (integer): This id refers to a location entry in the location table.
created_at (datetime): The date and time the order was placed.
customer_id (integer): The unique id of the customer that created the cart.

Cart_Inventory Table

Each record of the cart_inventory table 502 represents a relationship of a cart to an inventory item in the platform. A cart_inventory relationship represents a purchased item in a cart. The cart_inventory object (record) contains the following:

id (integer): The unique id of the cart-product relationship within the platform.
inventory_id (integer): An id referring to an inventory entry in the inventory table.
quantity (integer): The amount purchased in the cart.
created_at (datetime): The date and time the order was placed.
cart_id (integer): The unique id of the cart entry in the cart table.

The Process Flow

In some implementation, the flow of the platform with respect to products at retail locations includes at least the following activities.

1. Product data is obtained frequently by polling software (e.g., components) running on the participant's hardware or the server or a combination of them.
2. The acquired product data is converted to a canonical format at the participant's hardware, at the central server, or at a combination of them.
3. The translated product data is stored in the server database according to the canonical format and the product taxonomy.
4. The product data is processed and analyzed. For example, product data can be aggregated according to geography.
5. The product data and insights are then made available to participants free or by subscription.

Some implementations of the components running on the retailer's hardware and interacting with the server could be configured in accordance with the description in U.S. Pat. No. 9,836,772 (incorporated here by reference in its entirety).

User Interfaces

As discussed earlier, the platform can provide user interfaces, web pages, and dashboards for retail customers, retailers, and other product distribution entities in the distribution chain. The user interfaces for retail customers can be local online retail marketplaces.

The user interfaces for retailers can be in the form of a real-time dashboard, from which real-time product data (e.g., inventory) and corresponding analyses and insights can be viewed and manipulated from any Internet-capable device. The retailer user interface will allow retailers to order directly from suppliers (or set scheduled orders of products based on real-time inventory thresholds) and perform a variety of other functions. (e.g., de-list a product from its online retail site, assign a discount to a product, and other functions).

The user interface for suppliers allows suppliers to receive notifications, track and fulfill orders from individual (or groups of) retailers and retail locations, and view analyses and insights into shopping behavior within one or more local areas in real-time. Using a real-time dashboard from any Internet-capable device, the supplier can view the real-time inventory of every product it distributes at each retail location to which it delivers products. Suppliers can schedule just-in-time deliveries and learn about the market basket data for each local area, enabling the suppliers to determine how best to bundle products, what categories or sub-categories in which to expand their product lines, how to price their products, and where best to sell them. The supplier dashboard also will allow distributors to shop for products directly from manufacturers.

The user interface for manufacturers is a real-time dashboard that can be accessed from any Internet-capable device. In addition to receiving notifications of, tracking, and fulfilling orders from suppliers, manufacturers have access to real-time consumption and supplier product data. From this information the manufacturers can determine which products are selling in respective local areas and in what quantities. This information enables manufacturers to plan just-in-time production of those products (or raw materials, substitutes, or complements of those products).

The platform can implicitly coordinate the activities of all product distribution entities along a distribution chain. For example, based on the purchase behavior of retail customers within a local area, the retailer can determine what to offer for sale, the supplier can determine what to supply, and the manufacturer can determine what to make.

Third party participants 4242 can provide information and access information through a participant API 4141 communicating with the server components.

Other implementations are also within the scope of the following claims.

The invention claimed is:

1. A computer-based method for improving the operation of a central server of a platform in providing online presences simultaneously for different respective independent physical retail locations, the improving of the operation of the central server comprising:

the central server repeatedly receiving through a communication network from different devices operated for with the respective independent physical retail locations, separate current product data identifying products and numbers at units of the products currently available at each of the respective independent physical retail locations, the central server maintaining the separate current product data for each of the respective independent physical retail locations in a storage at the server;

the central server repeatedly updating the separate current product data separately for each of the respective independent physical retail locations stored at the central server to reflect the repeatedly received separate current product data;

the central server serving through a communication network to respective devices running web browsers or apps, respective separate local online retail marketplaces for corresponding independent physical retail locations associated with a defined local geographic area, the local online retail marketplaces being served to the devices for presentation by user interfaces of the devices;

the central server serving different ones of the separate local online retail marketplaces at different times to a given one of the devices;

the central server serving different ones of the separate local online retail marketplaces to different respective devices at a given time;

the central server serving each of the separate local online retail marketplaces on behalf of a particular corresponding one of the independent physical retail locations;

the central server including, in the separate local online retail marketplaces, online pages identifying a menu of products and numbers of units of products currently available at the corresponding independent physical retail location serving the defined local geographic area, the menu of products of each respective local online retail marketplace being based on the updated product data stored at the central server for that independent physical retail location, the menu of products of the independent physical retail location enabling creation of carts and placement of orders with the independent physical retail location with respect to the products currently available at the independent physical retail location; and controlling the server of the platform independently of the devices associated with the independent physical retail locations.

2. The method of claim 1 comprising
repeatedly communicating product data from an application on a device associated with a retail location to the server,
the product data identifying (a) current numbers of units of products available for retail customers at the retail location and (b) purchasing behavior of retail customers of the retail location with respect to combinations of the products, and
repeatedly restocking the retail location with additional units of products to maintain the products in an in-stock state, the additional units having been received in deliveries made from one or more upstream product distribution entities based on predictions facilitated by the server of future demand for the products by retail customers of the retail location.

3. The method of claim 2 in which the product data is communicated in response to polling.

4. The method of claim 2 in which the application on the device comprises a POS system.

5. The method of claim 2 comprising the predictions having been based on the product data communicated to the server.

6. The method of claim 2 comprising the predictions having been based on product data communicated to the central server from applications on devices associated with other retail locations.

7. The method of claim 2 comprising the deliveries having been made without any action having been required by the retail location.

8. The method of claim 2 comprising transferring units of the products to retail customers without delay after purchase by the retail customers.

9. The method of claim 8 in which transferring units of products without delay comprises delivering units of the products within eight hours after they are ordered or purchased.

10. The method of claim 2 comprising informing one or more upstream product distribution entities of the in-stock state and predictions of future in-stock state of the products at the retail location.

11. The method of claim 1 comprising
at an application on a device associated with a wholesaler or distributor of retail products to retail locations, repeatedly receiving product data from the server,
the product data identifying predictions of units of products to be delivered and timing of deliveries of the units of products to retail locations to maintain the products in an in-stock state, and
causing delivery of the identified units to the retail locations at times consistent with the identified timing of deliveries.

12. The method of claim 11 in which the application on the device comprises a component of an inventory management system.

13. The method of claim 11 comprising the predictions having been based on product data received by the server from the retail locations, the received product data having identified (a) current numbers of units of products available for retail customers at the retail locations and (b) purchasing behavior of retail customers of the retail locations with respect to combinations of the products.

14. The method of claim 11 in which the causing of delivery comprises causing delivery without requiring prompting by the retail locations.

15. The method of claim 1 in which the devices associated with the physical retail locations comprise components of POS systems.

16. The method of claim 1 in which the product data is received at the server without requiring action by the physical retail locations.

17. The method of claim 1 comprising
repeatedly receiving, at the server, from devices associated with product distribution entities, product data having aspects confidential to the product distribution entities, the platform being controlled independently of the product distribution entities,
storing the product data including the confidential aspects at the server,
controlling access to protect the confidential aspects of the product data,
processing the product data to produce derived information about a product distribution chain for the products, the derived information not revealing the confidential aspects, and
communicating the derived information to participants of the platform.

18. The method of claim 17 in which processing the product data comprises predicting demand for the products.

19. The method of claim 17 in which processing the product data comprises aggregating the data to produce aggregated data free of the confidential aspects.

20. The method of claim 17 in which processing the product data comprises analyzing consumer demand behavior.

21. The method of claim 17 in which processing the product data comprises analyzing supply.

22. The method of claim 17 in which storing the product data comprises translating the product data to a canonical form and storing the canonical form.

23. The method of claim 22 in which communicating the derived information comprises translating the product data from the canonical form to proprietary forms used by the participants of the platform.

24. The method of claim 17 in which receiving product data from devices associated with product distribution entities comprises receiving product data from product distribution entities at two or more stages of a product distribution chain.

25. The method of claim 17 in which receiving product data from devices associated with product distribution entities comprises receiving product data from product distribution entities that are competitors at a given stage of a product distribution chain.

26. The method of claim 17 in which the product data comprises transactions in which products are sold by product distribution entities to end consumers.

27. A computer-based method for improving the operation of a central server at a platform in coordinating distribution of physical of products from suppliers to independent physical retail locations as numbers of the products available for delivery from the independent physical retail locations change, the improving of the operation at the central server comprising:

the central server repeatedly receiving through a communication network, from different devices operated for respective competitor physical independent retail locations, separate current product data identifying products and numbers of units of the products currently available at each at the respective independent physical retail locations;

the central server maintaining the separate current product data for the respective independent physical retail locations in storage at the central server;

the central server repeatedly updating the separate current product data separately for each of the respective independent physical retail locations stored at the central server to reflect the repeatedly received separate current product data the central server serving, through a communication network to respective devices running web browsers or apps, respective separate local online retail marketplaces for corresponding independent physical retail locations serving a defined local geographic area, the local online retail marketplaces being served tar presentation through user interfaces of the devices;

the central server serving different ones of the separate local online retail marketplaces at different times to a given one of the computing devices or mobile devices, the central server serving different ones of the separate local online retail marketplaces to different computing devices and mobile devices at a given time;

the central server serving each of the separate local online retail marketplaces on behalf of a particular corresponding one of the independent physical retail locations;

the central server including in each of the separate local online retail marketplaces online pages identifying a menu of products and numbers of units of products currently available at the corresponding independent physical retail location serving the defined local geographic area, the menu of products of each respective local online retail marketplace being based on the updated product data stored at the central server for that independent physical retail location, the menu of products of the independent physical retail location enabling retail customers to create carts and place orders at the independent physical retail location;

the central server predicting numbers of units of the products to be delivered and timing of deliveries of the units of the products to the competitor physical independent retail locations needed to maintain the products in an in-stock state at the competitor physical independent retail locations, the predicting being based on the product data repeatedly received by the central server from the competitor physical independent retail locations;

the central server repeatedly sending to devices associated with competitor suppliers of the products, information about current and future in-stock states of the products at the competitor physical independent retail locations, the information including the predictions; and controlling the central server of the platform independently of the devices associated with the competitor physical retail locations and the devices associated with the competitor suppliers of the products.

* * * * *

UNITED STATES PATENT AND TRADEMARK OFFICE
CERTIFICATE OF CORRECTION

PATENT NO. : 10,664,801 B1
APPLICATION NO. : 16/212538
DATED : May 26, 2020
INVENTOR(S) : Socrates Munaf Rosenfeld et al.

Page 1 of 1

It is certified that error appears in the above-identified patent and that said Letters Patent is hereby corrected as shown below:

In the Claims

Column 35, Line 34 please in Claim 1, before "the" delete "with".

Column 35, Line 36 please in Claim 1, delete "at" and insert --of--, therefor.

Column 37, Line 67 please in Claim 27, delete "at" and insert --of--, therefor.

Column 38, Line 1 please in Claim 27, after "physical" delete "of".

Column 38, Line 4 please in Claim 27, delete "at" and insert --of--, therefor.

Column 38, Line 12 please in Claim 27, delete "at" and insert --of--, therefor.

Column 38, Line 22 please in Claim 27, delete "data" and insert --data;--, therefor.

Column 38, Line 28 please in Claim 27, delete "tar" and insert --for--, therefor.

Signed and Sealed this
Seventh Day of July, 2020

Andrei Iancu
*Director of the United States Patent and Trademark Office*